United States Patent
Ishibashi et al.

(10) Patent No.: US 12,139,963 B2
(45) Date of Patent: Nov. 12, 2024

(54) METHOD FOR MANUFACTURING GLASS PANEL UNIT, AND GLASS PANEL UNIT ASSEMBLY

(71) Applicant: Panasonic Intellectual Property Management Co., Ltd., Osaka (JP)

(72) Inventors: Tasuku Ishibashi, Ishikawa (JP); Eiichi Uriu, Osaka (JP); Kazuya Hasegawa, Osaka (JP); Hiroyuki Abe, Osaka (JP); Masataka Nonaka, Osaka (JP); Takeshi Shimizu, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 482 days.

(21) Appl. No.: 17/602,342

(22) PCT Filed: Mar. 19, 2020

(86) PCT No.: PCT/JP2020/012475
§ 371 (c)(1),
(2) Date: Oct. 8, 2021

(87) PCT Pub. No.: WO2020/209033
PCT Pub. Date: Oct. 15, 2020

(65) Prior Publication Data
US 2022/0162903 A1  May 26, 2022

(30) Foreign Application Priority Data
Apr. 12, 2019 (JP) .................................. 2019-076001

(51) Int. Cl.
*E06B 3/677* (2006.01)
*E06B 3/66* (2006.01)
*E06B 3/663* (2006.01)

(52) U.S. Cl.
CPC ............ *E06B 3/677* (2013.01); *E06B 3/6612* (2013.01); *E06B 3/66342* (2013.01)

(58) Field of Classification Search
CPC ...... B32B 2307/724; B32B 2307/7242; B32B 2307/7244; B32B 17/10807–1099;
(Continued)

(56) References Cited

U.S. PATENT DOCUMENTS 11,299,422 B2 * 4/2022 Hasegawa ............... B32B 37/18
11,359,431 B2 * 6/2022 Abe ..................... E06B 3/67326
(Continued)

FOREIGN PATENT DOCUMENTS

| EP | 2851351 A1 | 3/2015 |
| JP | 2002-371350 A | 12/2002 |

(Continued)

OTHER PUBLICATIONS

International Search Report for corresponding Application No. PCT/JP2020/012475, mailed Jun. 16, 2020.
(Continued)

*Primary Examiner* — Brian E Glessner
*Assistant Examiner* — Daniel J Kenny
(74) *Attorney, Agent, or Firm* — Renner, Otto, Boisselle & Sklar, LLP

(57) ABSTRACT

A method for manufacturing a glass panel unit includes an assembling step, a gas exhausting step, and a sealing step. At least one of a first glass pane or a second glass pane includes a low-emissivity film. In a situation where the low-emissivity film is heated at a temperature increase rate of 4° C./min before a peripheral wall is melted, a ratio of an emission quantity of a rare gas emitted from the low-emissivity film at a deformation temperature of the partition to an emission quantity of the rare gas emitted from the low-emissivity film at 100° C. is equal to or less than 2.0.

8 Claims, 15 Drawing Sheets

(58) Field of Classification Search
CPC ....... C23C 14/34; E06B 3/677; E06B 3/6612; E06B 3/66342; E06B 3/66304; E06B 3/6775
USPC .................................................. 428/212–214
See application file for complete search history.

(56) References Cited

U.S. PATENT DOCUMENTS

2017/0210667 A1\* 7/2017 Abe ...................... E06B 3/6612
2018/0179806 A1\* 6/2018 Abe ........................ C03C 27/06
2019/0055776 A1  2/2019 Uriu

FOREIGN PATENT DOCUMENTS

WO      2017/056418 A1    4/2017
WO      2020/208228 A1   10/2020

OTHER PUBLICATIONS

Written Opinion for corresponding Application No. PCT/JP2020/012475, mailed Jun. 16, 2020.
Extended European Search Report dated Jun. 22, 2022 corresponding to European Application No. 20787484.3.

\* cited by examiner

METHOD FOR MANUFACTURING GLASS PANEL UNIT, AND GLASS PANEL UNIT ASSEMBLY

TECHNICAL FIELD

The present disclosure generally relates to a method for manufacturing a glass panel unit and a glass panel unit assembly. More particularly, the present disclosure relates to a method for manufacturing a thermally insulating glass panel unit and a glass panel unit assembly to make the glass panel unit.

BACKGROUND ART

Patent Literature 1 discloses a glass panel unit including a first panel, a second panel, a frame-shaped sealing member for hermetically bonding the first and second panels together; and spacers provided in an evacuated space (vacuum space) between the first and second panels. In this glass panel unit, each of the spacers includes a body made of a resin and at least one UV protection layer provided on the surface of the body.

According to Patent Literature 1, each spacer includes the UV protection layer, which reduces decomposition of the resin component that makes the body by an incoming ultraviolet ray, thus reducing the chances of a gas being produced in the vacuum space due to the decomposition.

Nevertheless, it is difficult to improve the quality of the vacuum space during the manufacturing process of the glass panel unit only by reducing the decomposition of the resin component due to the exposure to an ultraviolet ray. Thus, in general, it is often difficult to improve the thermal insulation properties of glass panel units.

CITATION LIST

Patent Literature

Patent Literature 1: WO 2017/056418 A1

SUMMARY OF INVENTION

An object of the present disclosure is to provide a method for manufacturing a glass panel unit and an assembly to make the glass panel unit, both of which are configured or designed to contribute to improving the thermal insulation properties of glass panel units.

A method for manufacturing a glass panel unit according to an aspect of the present disclosure includes an assembling step, a bonding step, a gas exhausting step, and a sealing step. The assembling step includes providing an assembly. The assembly includes a first glass pane, a second glass pane, a peripheral wall, an internal space, a partition, an exhaust port, and an air passage. The second glass pane is arranged to face the first glass pane. The peripheral wall has a frame shape and is provided between the first glass pane and the second glass pane. The internal space is surrounded with the first glass pane, the second glass pane, and the peripheral wall. The partition partitions the internal space into a first space and a second space. The exhaust port allows the second space to communicate with an external environment. The air passage allows the first space to communicate with the second space. At least one of the first glass pane or the second glass pane includes a low-emissivity film. The low-emissivity film is provided in the first space. The bonding step includes melting the peripheral wall to hermetically bond the first glass pane and the second glass pane together with the peripheral wall. The gas exhausting step includes exhausting a gas from the first space through the air passage, the second space, and the exhaust port. The sealing step includes deforming the partition at a temperature equal to or higher than a softening point of the partition to close the air passage. In a situation where the low-emissivity film is heated at a temperature increase rate of 4° C./min before the peripheral wall is melted, a ratio of an emission quantity of a rare gas emitted from the low-emissivity film at a deformation temperature of the partition to an emission quantity of the rare gas emitted from the low-emissivity film at 100° C. is equal to or less than 2.0.

A glass panel unit assembly according to another aspect of the present disclosure is an assembly for use to make a glass panel unit. The assembly includes a first glass pane, a second glass pane, a peripheral wall, an internal space, a partition, an exhaust port, and an air passage. The second glass pane is arranged to face the first glass pane. The peripheral wall has a frame shape and is provided between the first glass pane and the second glass pane. The internal space is surrounded with the first glass pane, the second glass pane, and the peripheral wall. The partition partitions the internal space into a first space and a second space. The exhaust port allows the second space to communicate with an external environment. The air passage allows the first space to communicate with the second space. At least one of the first glass pane or the second glass pane includes a low-emissivity film. The low-emissivity film is provided in the first space. In a situation where the low-emissivity film is heated at a temperature increase rate of 4° C./min before the peripheral wall is melted, a ratio of an emission quantity of a rare gas emitted from the low-emissivity film at a deformation temperature of the partition to an emission quantity of the rare gas emitted from the low-emissivity film at 100° C. is equal to or less than 2.0.

DESCRIPTION OF EMBODIMENTS

First of all, it will be described how the present inventors acquired a general idea of the present disclosure.

A glass panel unit has thermal insulation properties by creating a vacuum space between two glass panes. Nevertheless, such thermal insulation properties of the glass panel unit would decline, despite the presence of the vacuum space between the two glass panes, due to any one of the following three factors (1) to (3):

(1) A low-emissivity film provided for a glass pane transmits an infrared ray easily:

(2) Spacers that maintain a gap distance between the two glass panes transfer heat; or (3) The spacers deteriorate to emit a gas into the vacuum space.

Meanwhile, the present inventors discovered, as a result of extensive research, that such a decline in the thermal insulation properties of the glass panel unit would be caused due to not only any one of these three factors (1) to (3) but also the emission of residual gases from the low-emissivity film into the vacuum space during the manufacturing process of the glass panel unit. The present inventors also discovered that those gases emitted included a rare gas difficult to be adsorbed into a getter material. If such rare gases are present in the vacuum space, the transfer of heat via the rare gases would be one of obstructive factors that hamper improvement of the thermal insulation properties of the glass panel unit.

Thus, the present inventors discovered how the thermal insulation properties of the glass panel unit would be improved by reducing the emission of at least such rare gases from the low-emissivity film into the vacuum space, thus acquiring a general idea of the present disclosure.

EMBODIMENT

Next, an overview of a method for manufacturing a glass panel unit 10 according to this embodiment will be described.

Figure 6:
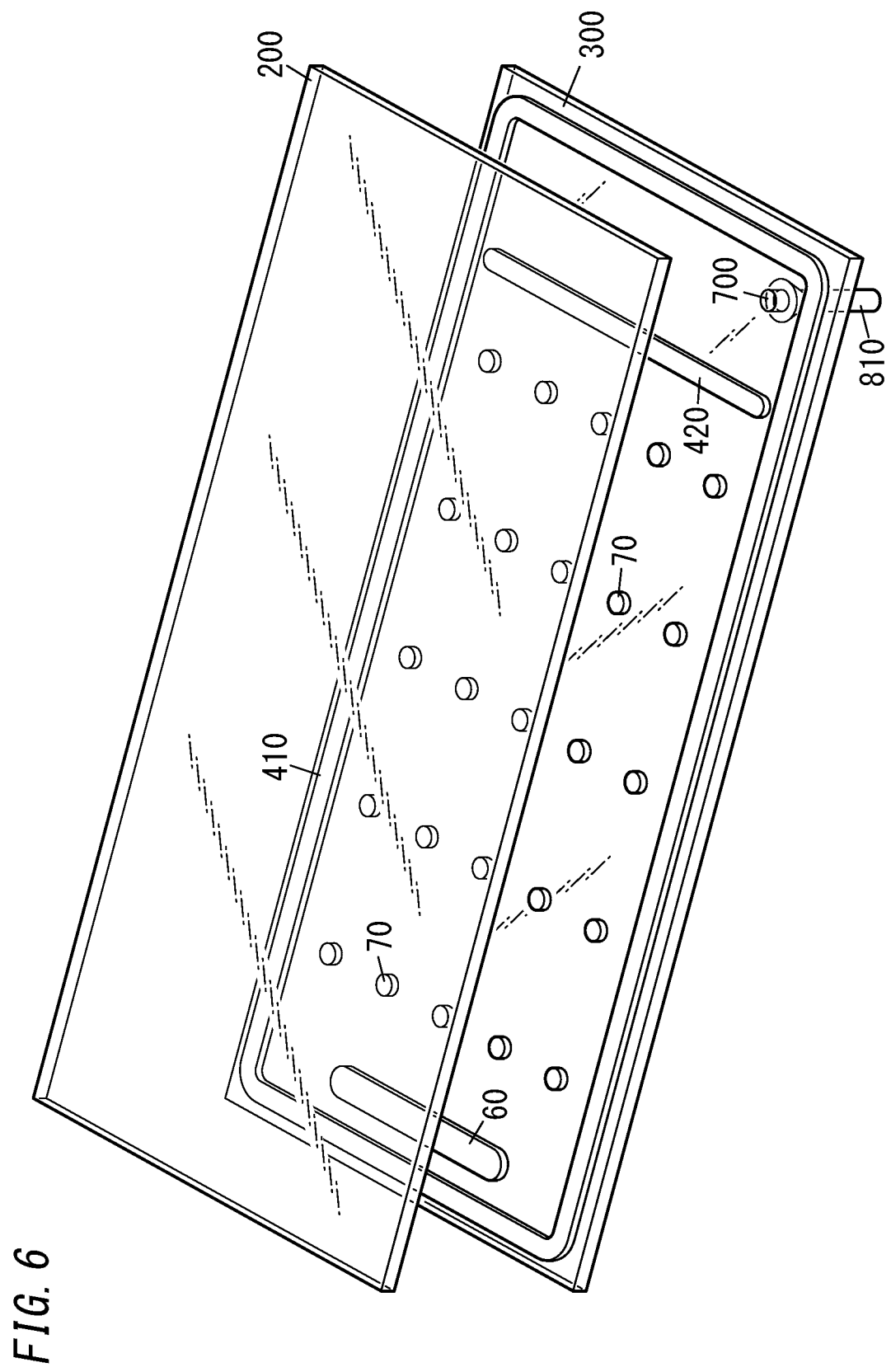
FIG. 6 illustrates still another step of the method for manufacturing the glass panel unit according to the exemplary embodiment.
Figure 7:
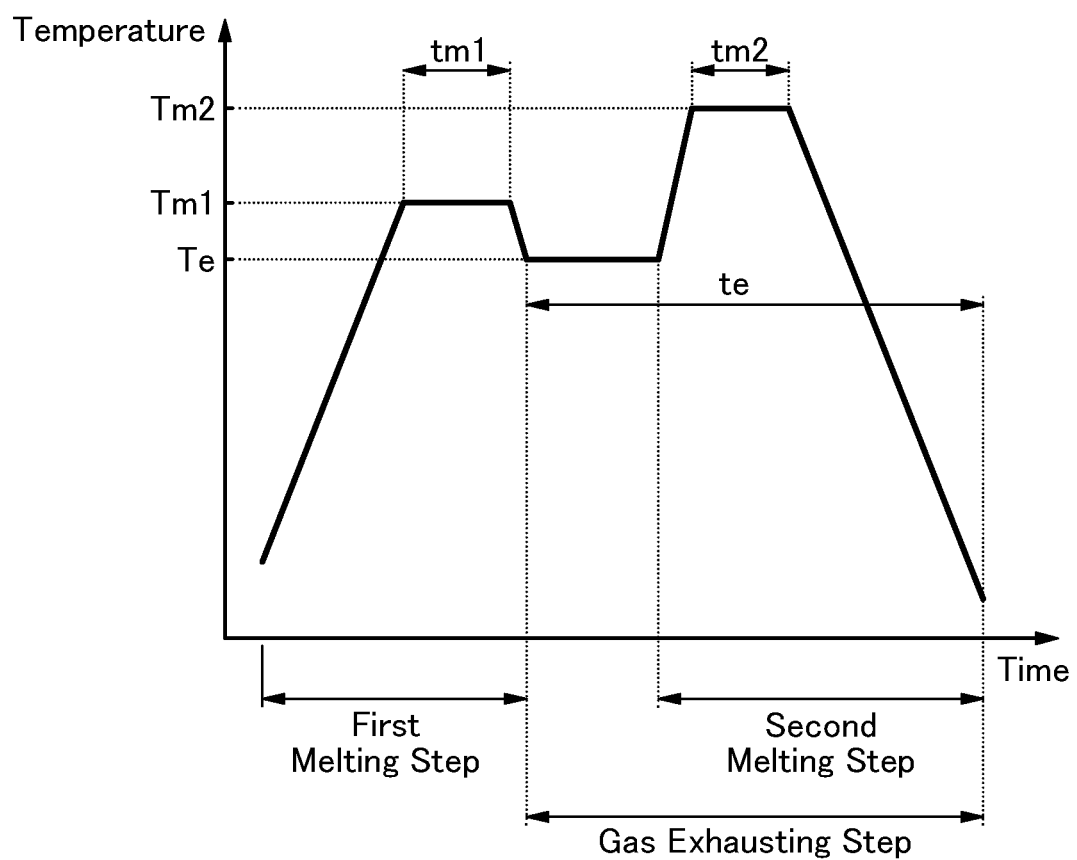
FIG. 7 shows how to perform respective steps of the method for manufacturing the glass panel unit according to the exemplary embodiment.

A method for manufacturing the glass panel unit 10 includes an assembling step (see FIGS. 4-6), a bonding step (a first melting step; see FIG. 7), a gas exhausting step (see FIG. 7), and a sealing step (a second melting step; see FIG. 7). The assembling step includes providing the assembly 100 shown in FIG. 3. The assembly 100 includes a first glass pane 200, a second glass pane 300, a peripheral wall 410, an internal space 500, a partition 420, an exhaust port 700, and air passages 600. The second glass pane 300 is arranged to face the first glass pane 200. The peripheral wall 410 has a frame shape and is provided between the first glass pane 200 and the second glass pane 300. The internal space 500 is surrounded with the first glass pane 200, the second glass pane 300, and the peripheral wall 410. The partition 420 partitions the internal space 500 into a first space 510 and a second space 520. The exhaust port 700 allows the second space 520 to communicate with an external environment. The air passages 600 allows the first space 510 to communicate with the second space 520. At least one of the first glass pane 200 or the second glass pane 300 includes a low-emissivity film 22. The low-emissivity film 22 is provided in the first space 510. The bonding step includes melting the peripheral wall 410 to hermetically bond the first glass pane 200 and the second glass pane 300 together with the peripheral wall 410. The gas exhausting step includes exhausting a gas from the first space 510 through the air passage 600, the second space 520, and the exhaust port 700. The sealing step includes deforming the partition 420 at a temperature equal to or higher than a softening point of the partition 420 to close the air passages 600. In a situation where the low-emissivity film 22 is heated at a temperature increase rate of 4° C./min from a temperature lower than 100° C. before the peripheral wall 410 is melted, a ratio of an emission quantity of a rare gas emitted from the low-emissivity film 22 at a deformation temperature of the partition 420 to an emission quantity of the rare gas emitted from the low-emissivity film 22 at 100° C. is equal to or less than 2.0.

This manufacturing method may reduce the emission quantity of a rare gas emitted from the low-emissivity film 22 after the partition 420 has been deformed to close the air passage 600. This allows reducing the quantity of the rare gas remaining in the first space 510 after the gas exhausting step and thereby reducing the transfer of heat in the first space 510 via the rare gas, thus improving the thermal insulation properties of the glass panel unit 10.

Next, a method for manufacturing the glass panel unit 10 according to this embodiment (hereinafter simply referred to as a "manufacturing method") will be described in detail with reference to FIGS. 1-15. This manufacturing method is a method for manufacturing the glass panel unit 10.

The manufacturing method includes preparatory steps and a removing step.

Figure 1:
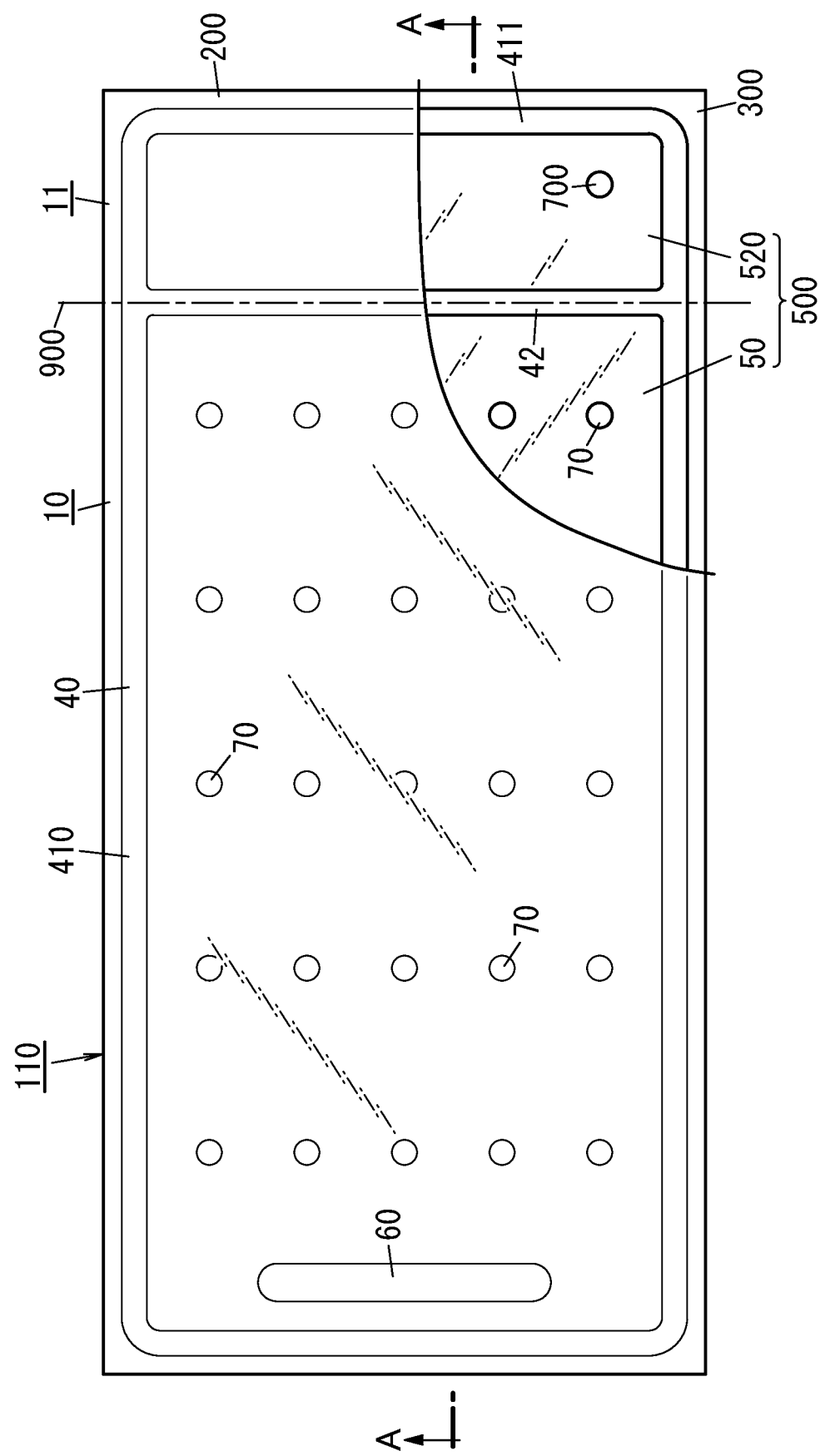
FIG. 1 is a schematic plan view of a work in progress according to an exemplary embodiment.
Figure 2:
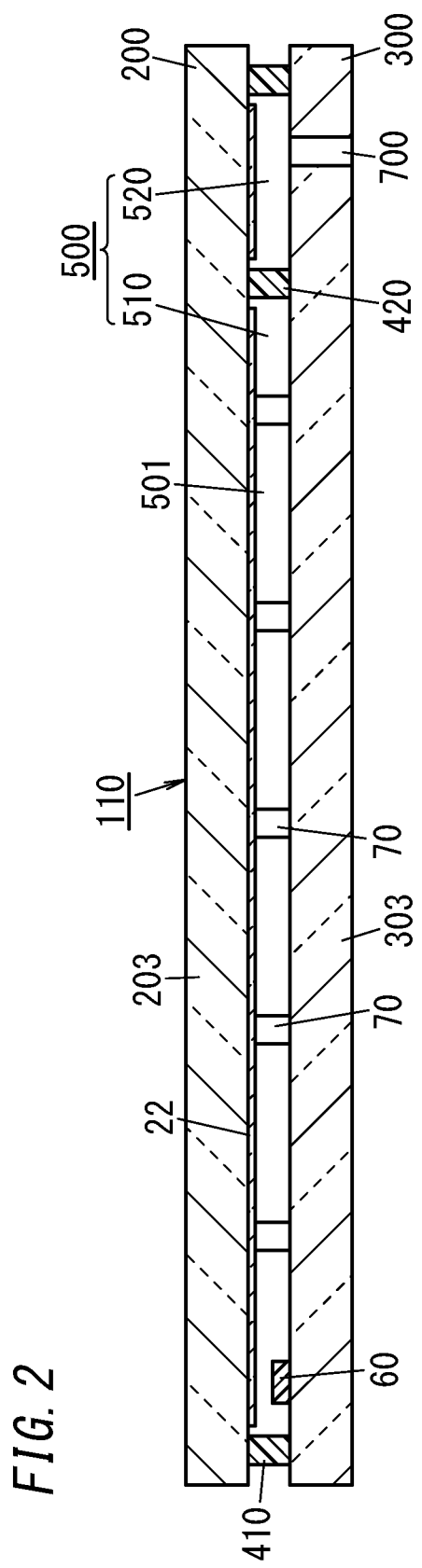
FIG. 2 is a cross-sectional view of the work in progress shown in FIG. 1 as taken along the plane A-A in FIG. 1.

The preparatory steps are the steps of providing the work in progress 110 shown in FIGS. 1 and 2. The work in progress 110 is formed out of the assembly 100 shown in FIG. 3. That is to say, the work in progress 110 is an intermediate product obtained while the glass panel unit 10 (see FIG. 11) is being manufactured. The assembly 100 is an intermediate product obtained while the work in progress 110 is being made.

The preparatory steps include an assembling step (see FIGS. 4-6), a first melting step (see FIG. 7), a gas exhausting step (see FIG. 7), and a second melting step (see FIG. 7).

The assembling step is the step of providing the assembly 100.

Figure 3:
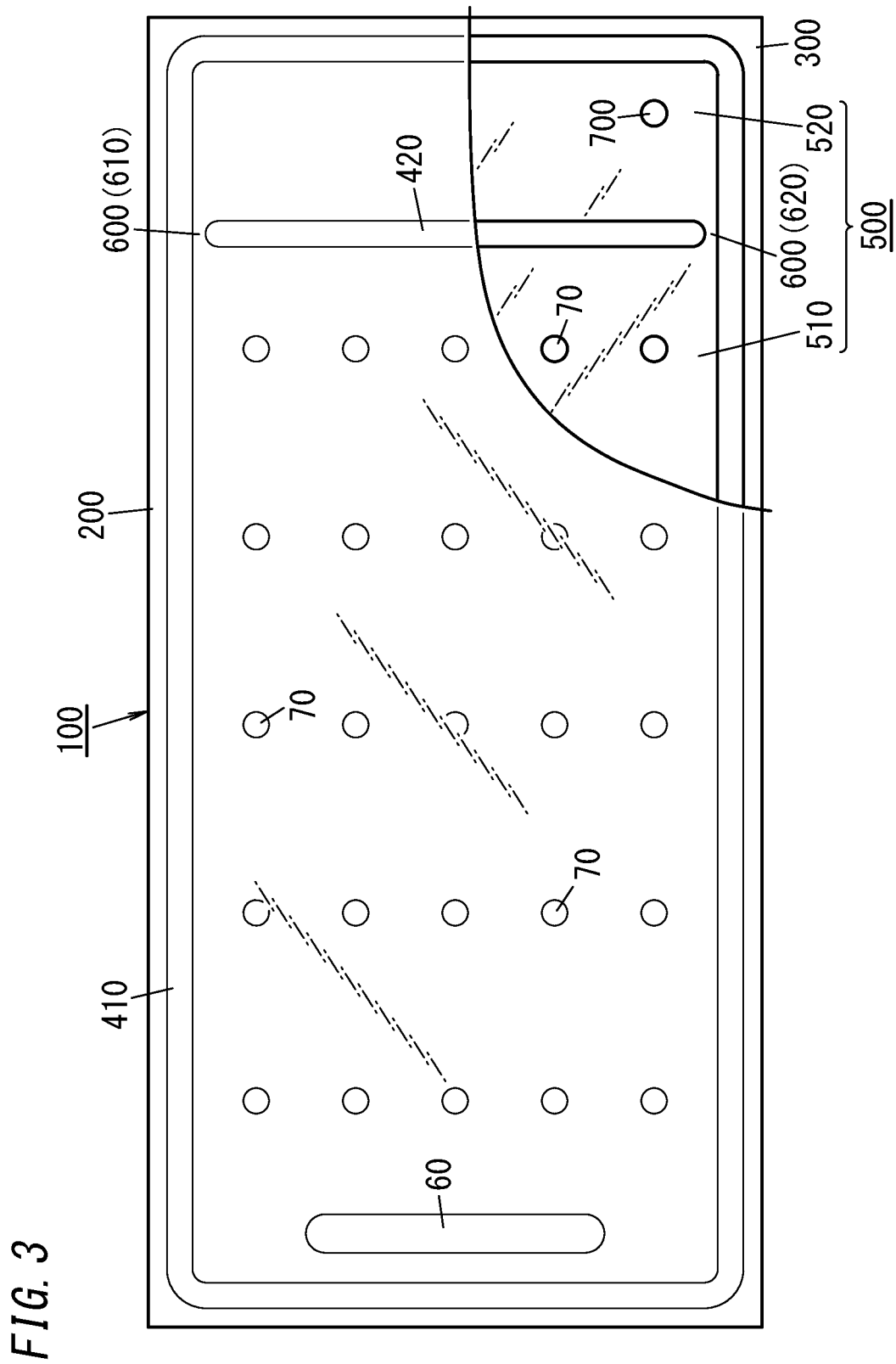
FIG. 3 is a schematic plan view of an assembly according to the exemplary embodiment.

As shown in FIG. 3, the assembly 100 includes a first glass pane 200, a second glass pane 300, a peripheral wall 410, and a partition 420. The assembly 100 further has an internal space 500 surrounded with the first and second glass panes 200, 300 and the peripheral wall 410. The assembly 100 further includes a gas adsorbent 60 and a plurality of spacers (pillars) 70 in the internal space 500. The assembly 100 further has an exhaust port 700.

The first glass pane (first glass substrate) 200 is a member that forms the basis of the first glass pane 20 to be described later and is made of the same material as the first glass pane 20. The second glass pane (second glass substrate) 300 is a member that forms the basis of the second glass pane 30 to be described later and is made of the same material as the second glass pane 30. The first and second glass panes 200, 300 have the same planar shape. In this embodiment, the first glass pane 200 has dimensions that are large enough to form at least one first glass pane 20 to be described later, and the second glass pane 300 has dimensions that are large enough to form at least one second glass pane 30 to be described later.

The first and second glass panes 200, 300 each have a polygonal flat plate shape (e.g., a rectangular shape in this embodiment).

The first glass pane 200 includes a body 203 and a low-emissivity film 22.

The low-emissivity film 22 is provided in the internal space 500 and covers the body 203. The low-emissivity film 22 is in contact with the body 203. The low-emissivity film 22 is also called an "infrared reflective film" and has light-transmitting properties but hardly transmits an infrared ray. Thus, the low-emissivity film 22 may improve the thermal insulation properties of the glass panel unit 10. The low-emissivity film 22 may be a thin metallic film, for example. The low-emissivity film 22 may contain silver, for example. The low-emissivity film 22 may be a Low-E film, for example.

The low-emissivity film 22 may be formed on the surface of the body 203 by a thin film forming technique such as sputtering. If sputtering is adopted as a technique for forming the low-emissivity film 22, then the low-emissivity film 22 may be formed, within a rare gas atmosphere such as argon, as a multi-layer film in which a plurality of metal layers, each containing silver, and a plurality of dielectric layers, each containing a metal oxide such as zinc oxide, for example, are alternately stacked one on top of another. Examples of other rare gases to use include helium, krypton, and xenon. Nevertheless, argon is preferred because argon is inexpensive and considered to be effective for sputtering.

On the other hand, if the low-emissivity film 22 contains a predetermined quantity or more of a rare gas, then the low-emissivity film 22 may emit a lot of rare gas into the vacuum space 50 (to be described later) when heated. In that case, the degree of vacuum in the vacuum space 50 (to be described later) tends to decrease because the rare gas is a component difficult to be adsorbed into the gas adsorbent 60. In such a situation, the transfer of heat by the rare gas is likely to cause a decline in the thermal insulation properties of the glass panel unit 10. Thus, the low-emissivity film 22 according to this embodiment has such properties that satisfy the following relationship between emission quantities (c1) and (c2).

In a situation where the low-emissivity film 22 is heated at a temperature increase rate of 4° C./min before the peripheral wall 410 is melted (i.e., before the first melting step), the ratio of the emission quantity (c1) to the emission quantity (c2) is equal to or less than 2.0, where the emission quantity (c1) is the quantity of a rare gas emitted from the low-emissivity film 22 at a deformation temperature of the partition 420 and the emission quantity (c2) is an emission quantity of the rare gas emitted from the low-emissivity film 22 at 100° C. The deformation temperature of the partition 420 is the second melting temperature $Tm2$ to be described later. The second melting temperature $Tm2$ is higher than 100° C. Imparting such properties that satisfy the relationship between the emission quantities (c1) and (c2) to the low-emissivity film 22 reduces the chances of the rare gas being emitted from the low-emissivity film 22 after the partition 420 has been deformed to close the air passages 600. That is to say, this may reduce the quantity of the rare gas in the vacuum space 50 to be described later.

This may reduce the transfer of heat via the rare gas in the vacuum space 50, thus contributing to improving the thermal insulation properties of the glass panel unit 10. The ratio of the emission quantity (c1) to the emission quantity (c2) is suitably equal to or less than 1.7, more suitably equal to or less than 1.5, even more suitably equal to or less than 1.3, and most suitably equal to or less than 1.0. The emission quantity (c1) is particularly suitably less than the emission quantity (c2). The method for measuring the emission quantity (c1) and the emission quantity (c2) will be described later as for examples of the present disclosure. Note that when the emission quantity (c1) and the emission quantity (c2) are measured, a sample of the low-emissivity film 22 that has been taken until the body 203 is exposed is used as a specimen. That is to say, each of the emission quantity (c1) and the emission quantity (c2) represents the quantity of the rare gas emitted from the specimen in its entirety.

The first glass pane 200 includes the body 203 as described above. The body 203 defines the main shape of the first glass pane 200, and therefore, has a rectangular flat plate shape. Examples of materials for the body 203 include soda lime glass, high strain point glass, chemically tempered glass, alkali-free glass, quartz glass, Neoceram, and thermally tempered glass.

The second glass pane 300 includes a body 303. The body 303 defines the main shape of the second glass pane 300, and therefore, has a rectangular flat plate shape. The body 303 has the same shape as the body 203. In this embodiment, the second glass pane 300 consists of the body 303 alone. Optionally, the second glass pane 300 may include not only the body 303 but also a low-emissivity film corresponding to the low-emissivity film 22. If the second glass pane 300 includes a low-emissivity film, then the low-emissivity film covers, and is in contact with, the body 303 in the internal space 500. Examples of materials for the body 303 include soda lime glass, high strain point glass, chemically tempered glass, alkali-free glass, quartz glass, Neoceram, and thermally tempered glass.

The peripheral wall 410 contains a first sealing material (i.e., a first hot glue). The peripheral wall 410 is disposed between the first glass pane 200 and the second glass pane 300. The peripheral wall 410 has a frame shape as shown in FIG. 6. Particularly, the peripheral wall 410 has a rectangular frame shape. The peripheral wall 410 is formed along the respective outer peripheries of the first and second glass panes 200, 300. Thus, in the assembly 100, an internal space 500 is created to be surrounded with the peripheral wall 410, the first glass pane 200, and the second glass pane 300.

The first hot glue may be a glass frit, for example. The glass frit may be a low-melting glass frit, for example. Examples of the low-melting glass frits include a bismuth-based glass frit, a lead-based glass frit, and a vanadium-based glass frit. The first hot glue does not have to be a glass frit but may also be a low-melting metal or a hot-melt adhesive, for example.

The partition 420 contains a second sealing material (second hot glue). The partition 420 is placed in the internal space 500. The partition 420 partitions the internal space 500 into a first space 510 and a second space (ventilation space) 520. Thus, the first space 510 is a space from which a gas is exhausted in the gas exhausting step. The second space 520 is a space for use to exhaust a gas from the first space 510. The partition 420 is provided closer to a first end (i.e., the right end in FIG. 3) along the length (i.e., the rightward/leftward direction in FIG. 3) of the second glass pane 300 than to the center of the second glass pane 300 such that the first space 510 has a larger area than the second space 520. The partition 420 is a linear member arranged along the width (i.e., the upward/downward direction in FIG. 3) of the second glass pane 300. Nevertheless, neither longitudinal end of the partition 420 is in contact with the peripheral wall 410.

The second hot glue may be a glass frit, for example. The glass frit may be a low-melting glass frit, for example. Examples of the low-melting glass frits include a bismuth-based glass frit, a lead-based glass frit, and a vanadium-based glass frit. The second hot glue does not have to be a glass frit but may also be a low-melting metal or a hot-melt adhesive, for example. In this embodiment, the same type of glue is used as the first and second hot glues. That is to say, the first and second sealing materials are the same material.

The air passages 600 allow the first space 510 and the second space 520 to communicate with each other in the internal space 500 as shown in FIG. 3. The air passages 600 include a first air passage 610 and a second air passage 620. The first air passage 610 is a gap between a first end (i.e., the upper end in FIG. 3) of the partition 420 and the peripheral wall 410. The second air passage 620 is a gap between a second end (i.e., the lower end in FIG. 3) of the partition 420 and the peripheral wall 410.

The exhaust port 700 is a hole that allows the second space 520 to communicate with the external environment. The exhaust port 700 is used to exhaust a gas from the first space 510 through the second space 520 and the air passages 600 (namely, the first air passage 610 and the second air passage 620). Thus, the air passages 600, the second space 520, and the exhaust port 700 together form an exhaust path for exhausting a gas from the first space 510. The exhaust port 700 is provided through the second glass pane 300 to allow the second space 520 to communicate with the external environment. Specifically, the exhaust port 700 is provided at a corner portion of the second glass pane 300.

The gas adsorbent 60 and the plurality of spacers 70 are arranged in the first space 510. In particular, the gas adsorbent 60 is formed along the width of the second glass pane 300 so as to be located close to a second end along the length (i.e., the left end in FIG. 4) of the second glass pane 300. That is to say, the gas adsorbent 60 is placed at an end of the first space 510 (vacuum space 50). This makes the gas adsorbent 60 less noticeable. In addition, the gas adsorbent 60 is located distant from the partition 420 and the air passage 600. This reduces the chances of the gas adsorbent 60 interfering with exhausting a gas from the first space 510.

The assembling step is the step of forming the first glass pane 200, the second glass pane 300, the peripheral wall 410, the partition 420, the internal space 500, the air passages 600, the exhaust port 700, the gas adsorbent 60, and the plurality of spacers 70 to obtain the assembly 100. The assembling step includes first to sixth steps. Optionally, the order in which the second to fifth steps are performed may be changed as appropriate.

The first step is the step of forming the first glass pane 200 and the second glass pane 300 (i.e., a substrate forming step). For example, the first step includes making the first glass pane 200 and the second glass pane 300. In the first step, evaluation is suitably made whether the low-emissivity film 22 satisfies the relationship between the emission quantity (c1) and the emission quantity (c2). If necessary, the first step may further include cleaning the first glass pane 200 and the second glass pane 300.

The second step is the step of forming the exhaust port 700. The second step includes providing the exhaust port 700 through the second glass pane 300 as shown in FIG. 3. If necessary, the second step includes cleaning the second glass pane 300.

Figure 4:
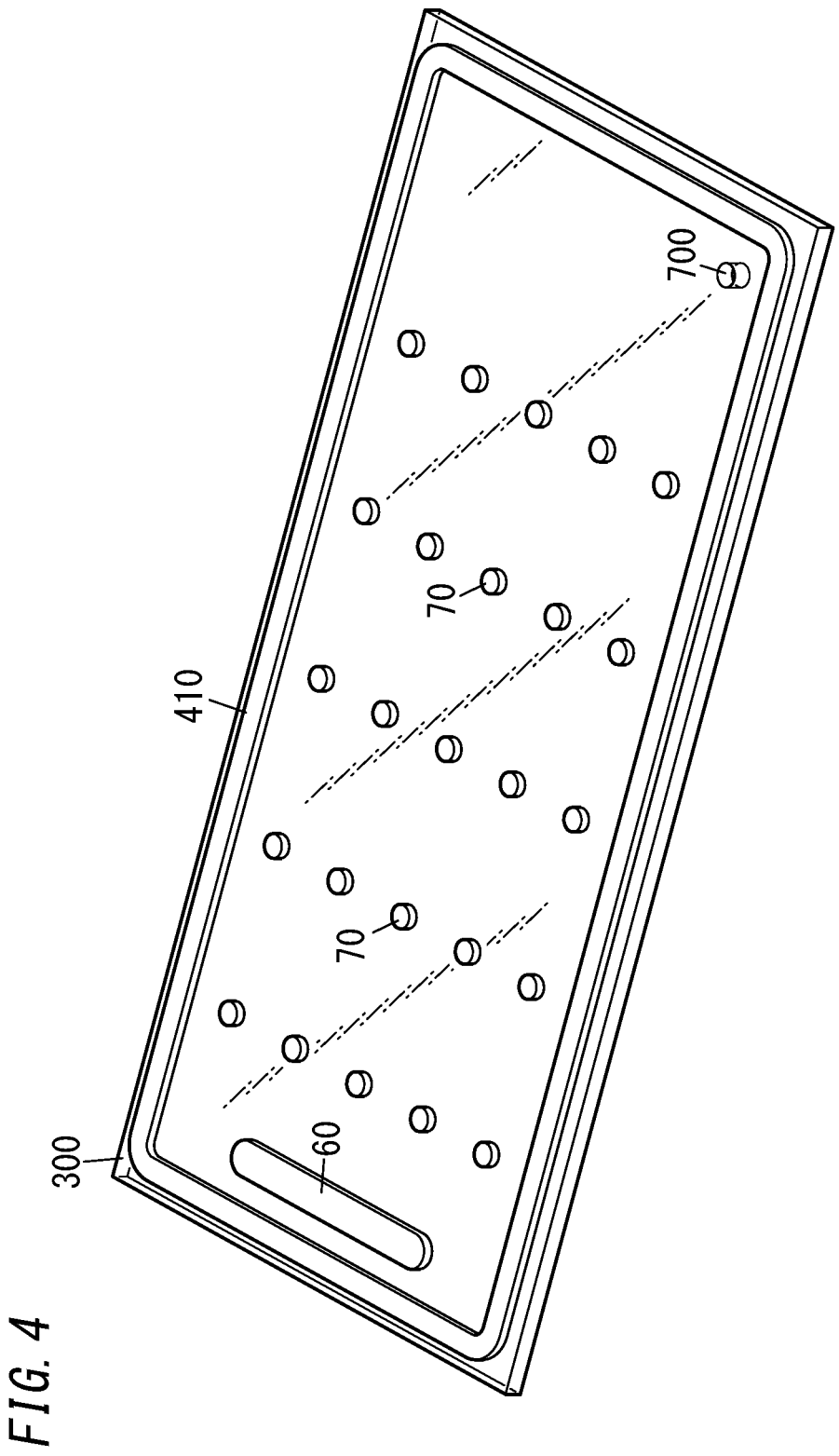
FIG. 4 illustrates a step of a method for manufacturing a glass panel unit according to the exemplary embodiment.

The third step is the step of forming the spacers 70 (spacer forming step) (see FIG. 4). The third step includes forming a plurality of spacers 70 in advance and placing, using a chip mounter or any other tool, the plurality of spacers 70 at predetermined positions on the second glass pane 300. The plurality of spacers 70 will be used to maintain a predetermined gap distance between the first and second glass panes 200, 300 when the assembly 100 turns into a work in progress 110. Examples of constituent materials for such spacers 70 include metals, glass, and resins. The spacers 70 may contain one or a plurality of materials selected from these materials.

In the third step according to this embodiment, the spacers 70 are formed in advance and placed on the second glass pane 300 as described above. Alternatively, the plurality of spacers 70 may also be formed on the second glass pane 300 by a known thin film forming technique. Still alternatively, if the spacers 70 include a resin, the plurality of spacers 70 may also be formed by a combination of photolithography and etching techniques instead of the forming method described above. In that case, the plurality of spacers 70 may be made of a photocurable material, for example.

Note that the dimensions, number, spacing, and arrangement pattern of the spacers 70 may be selected appropriately. Each of the spacers 70 has the shape of a circular column, of which the height is approximately equal to the predetermined gap distance. For example, the spacers 70 may have a diameter of 1 mm and a height of 100 µm. Optionally, the spacers 70 may also have any other desired shape such as a rectangular columnar or spherical shape.

The fourth step is the step of forming the gas adsorbent 60 (gas adsorbent forming step) (see FIG. 4). The fourth step includes forming the gas adsorbent 60 by applying, using a dispenser, for example, a solution in which a powder of a getter material is dispersed onto a predetermined position on the second glass pane 300 and then drying the solution.

The gas adsorbent 60 includes a getter material. The getter material is a material having the property of adsorbing molecules smaller in size than a predetermined one. The getter material may be an evaporative getter material, for example. The evaporative getter material has the property of releasing adsorbed molecules when heated to a predetermined temperature (activation temperature) or more. This allows, even if the adsorption ability of the evaporative getter material deteriorates once, the evaporative getter material to recover its adsorption ability by being heated to the activation temperature or more. The evaporative getter material may be a zeolite or an ion-exchanged zeolite (such as a copper ion exchanged zeolite). The gas adsorbent 60 includes a powder of this getter material. Specifically, the gas adsorbent 60 may be formed by applying a liquid including a powder of the getter material (such as a dispersion liquid obtained by dispersing a powder of the getter material in a liquid or a solution obtained by dissolving a powder of the getter material in a liquid) and solidifying the liquid. This reduces the size of the gas adsorbent 60, thus allowing the gas adsorbent 60 to be arranged even when the first space 510 is narrow.

The fifth step is the step of arranging the peripheral wall 410 and the partition 420 (sealing material arrangement step). The fifth step includes forming the peripheral wall 410 by applying, using a dispenser, for example, a first sealing material onto the second glass pane 300 and then drying the first sealing material (see FIG. 4). The fifth step also includes forming the partition 420 by applying, using a dispenser, for example, a second sealing material onto the second glass pane 300 and then drying the second sealing material (see FIG. 5).

Figure 5:
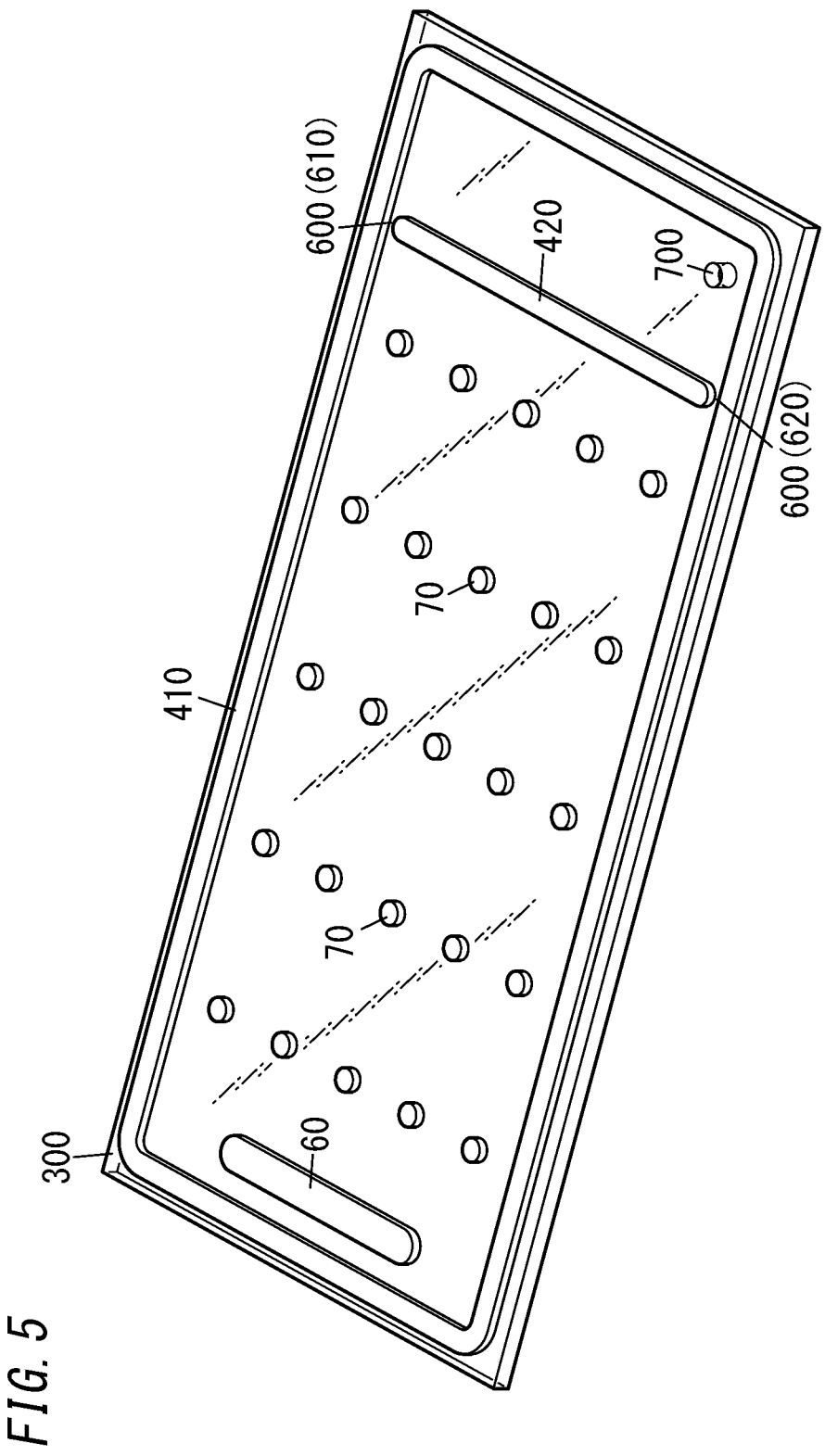
FIG. 5 illustrates another step of the method for manufacturing the glass panel unit according to the exemplary embodiment.

By performing these first to fifth steps, the second glass pane 300 such as the one shown in FIG. 5 is obtained. On this second glass pane 300, the peripheral wall 410, the partition 420, the air passages 600, the exhaust port 700, the gas adsorbent 60, and the plurality of spacers 70 have been formed.

The sixth step is the step of arranging the first glass pane 200 and the second glass pane 300 (arrangement step). In the sixth step, the first glass pane 200 and the second glass pane 300 are arranged to be parallel to each other and face each other as shown in FIG. 6.

The assembly 100 shown in FIG. 3 is obtained by performing this assembling step. After the assembling step has been performed, a first melting step (bonding step), a gas exhausting step, and a second melting step (sealing step) are carried out as shown in FIG. 7.

The first melting step is the step of melting the peripheral wall 410 once to hermetically bond the first glass pane 200 and the second glass pane 300 together with the peripheral wall 410. Specifically, the first glass pane 200 and the second glass pane 300 are loaded into a melting furnace and heated at a first melting temperature Tm1 for a predetermined period of time (first melting time) tm1 (see FIG. 7). In this embodiment, the first sealing material and the second sealing material are the same material as described above, and therefore, the softening point of the first sealing material (first softening point) is the same as the softening point of the second sealing material (second softening point). Thus, the first melting temperature Tm1 is set at a temperature equal to or higher than the first and second softening points. Even if the first melting temperature Tm1 is equal to or higher than the first and second softening points, the partition 420 does not close the air passages 600 in the first melting step because the gas exhausting step is started after the first melting step (see FIG. 7). That is to say, in the first melting step, the air passages 600 are still available. In the first melting step, if the first and second softening points is 434° C., for example, the first melting temperature Tm1 may be set at 440° C. The first melting time tm1 may be 10 minutes, for example.

In this embodiment, the implementation in which the first softening point is the same as the second softening point covers not only an implementation in which the first softening point is exactly the same as the second softening point but also an implementation in which the first softening point is approximately equal to the second softening point.

Heating the peripheral wall 410 at the first melting temperature Tm1 allows the peripheral wall 410 to be softened while reducing the deformation of the partition 420. This facilitates hermetically bonding the first glass pane 200 and the first glass pane 200 with the peripheral wall 410.

Figure 8:
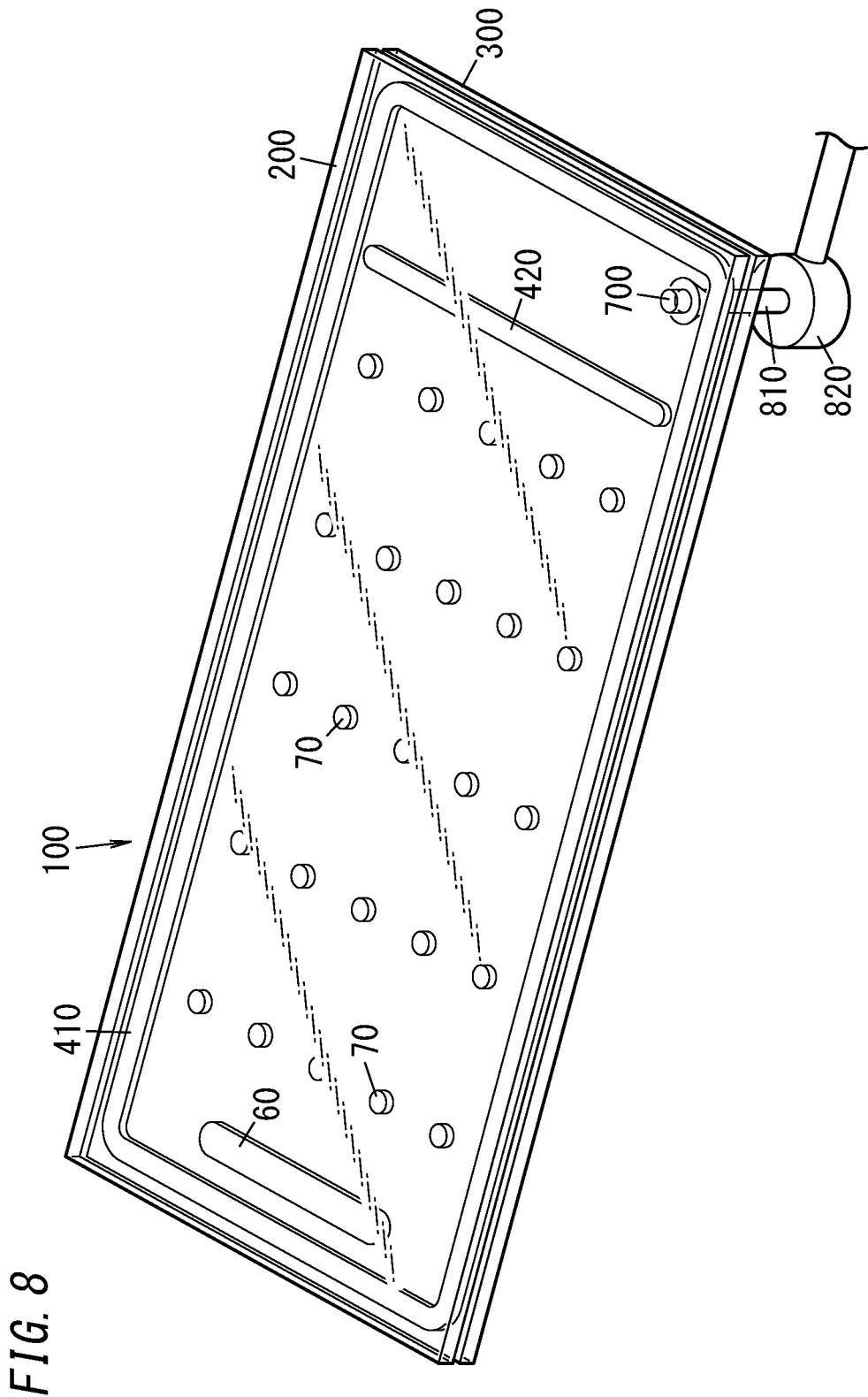
FIG. 8 illustrates yet another step of the method for manufacturing the glass panel unit according to the exemplary embodiment.

The gas exhausting step is the step of exhausting a gas from the first space 510 through the air passages 600, the second space 520, and the exhaust port 700 to turn the first space 510 into a vacuum space 50. The gas may be exhausted using a vacuum pump, for example. The vacuum pump may be connected to the assembly 100 via an exhaust pipe 810 and a sealing head 820 as shown in FIG. 8. The exhaust pipe 810 may be bonded to the second glass pane 300 such that the inside of the exhaust pipe 810 and the exhaust port 700 communicate with each other, for example. Then, the sealing head 820 is attached to the exhaust pipe 810, thereby connecting a suction port of the vacuum pump to the exhaust port 700. The first melting step, the gas exhausting step, and the second melting step are performed with the assembly 100 kept loaded in the melting furnace. Therefore, the exhaust pipe 810 is bonded to the second glass pane 300 at least before the first melting step.

The gas exhausting step includes exhausting a gas from the first space 510 through the air passages 600, the second space 520, and the exhaust port 700 at a temperature equal to or higher than an exhaust temperature Te for a predetermined period of time (exhaust time) te or more before the second melting step is started (see FIG. 7). The exhaust temperature Te is set at a temperature higher than the activation temperature (e.g., 350° C.) of the getter material (getter material fine powder) of the gas adsorbent 60 but lower than the second softening point (e.g., 434° C.) of the second sealing material. The exhaust temperature Te may be 390° C., for example. This prevents the partition 420 from being deformed even in this gas exhausting step. In addition, this activates the getter material of the gas adsorbent 60, thus causing the molecules (of the gas) adsorbed into the getter material to be released from the getter material. In addition, at least a rare gas is emitted from the low-emissivity film 22. Then, the gases emitted from the getter material and the low-emissivity film 22 are exhausted through the first space 510, the air passages 600, the second space 520, and the exhaust port 700. Thus, exhausting the gases emitted from the getter material through this gas exhausting step allows the gas adsorbent 60 to recover its adsorption ability. The exhaust time te is set to create a vacuum space 50 with a predetermined degree of vacuum (e.g., a degree of vacuum of 0.1 Pa or less). The exhaust time to may be set at 120 minutes, for example.

Figure 9:
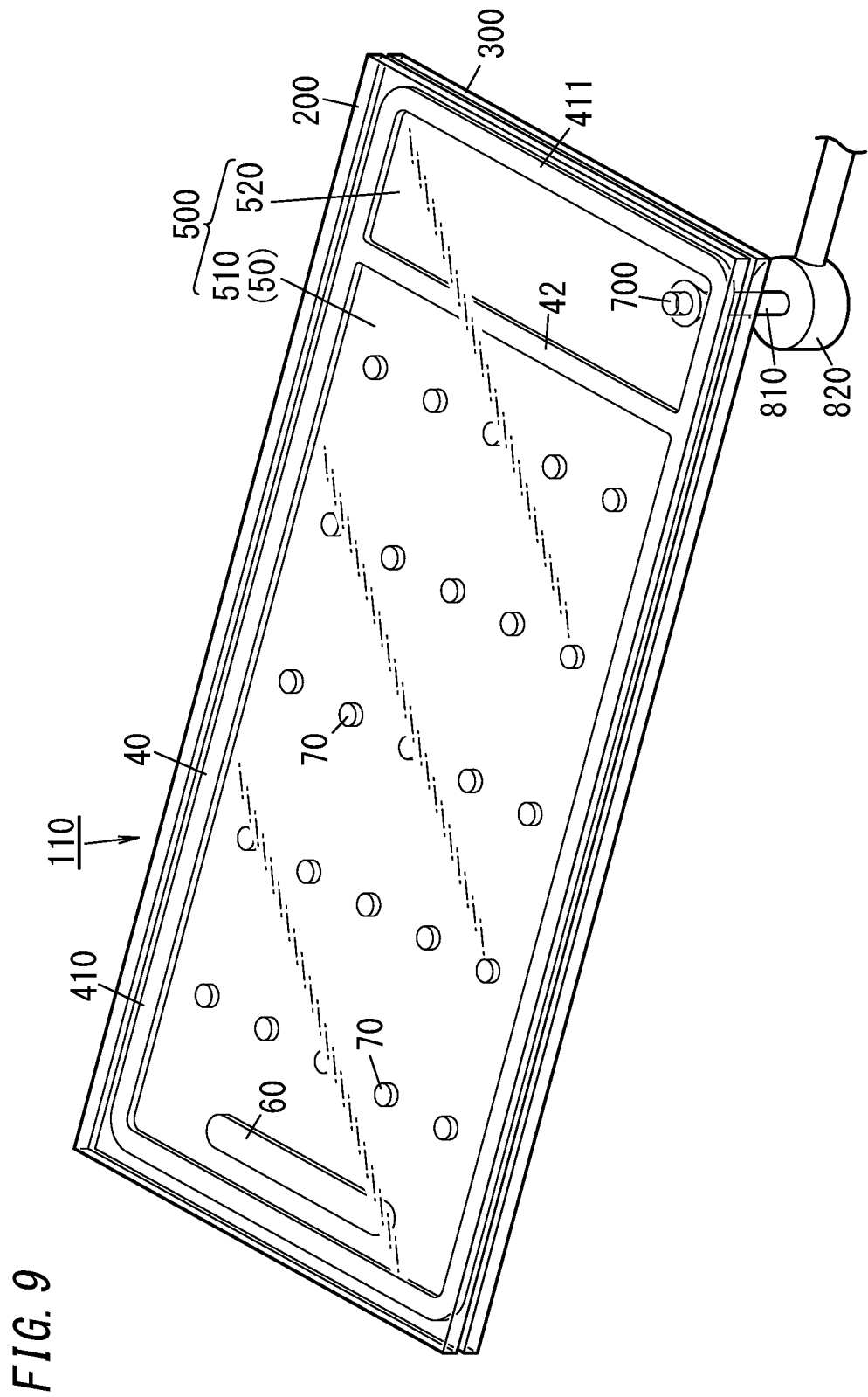
FIG. 9 illustrates yet another step of the method for manufacturing the glass panel unit according to the exemplary embodiment.

The second melting step is the step of closing at least the air passages 600 by deforming the partition 420 to form a boundary wall 42 and thereby obtain a work in progress 110. That is to say, the second melting step includes closing the air passages 600 by deforming the partition 420. In other words, the first space 510 is closed by the partition 420 deformed so that the first space 510 and the second space 520 are separated from each other. In this manner, a frame member 40 surrounding the vacuum space 50 is formed (see FIG. 9). In this embodiment, the partition 420 is deformed such that both longitudinal ends of the partition 420 come into contact with, and are integrated with, the peripheral wall 410. As a result, a boundary wall 42 is formed which hermetically separates the internal space 500 into the first space 510 (vacuum space 50) and the second space 520 as shown in FIG. 9. More specifically, melting the partition 420 once at a predetermined temperature (second melting temperature) Tm2 equal to or higher than the second softening point of the second sealing material causes the partition 420 to be deformed. Specifically, the first glass pane 200 and the second glass pane 300 are heated in the melting furnace at the second melting temperature Tm2 for a predetermined period of time (second melting time) tm2 (see FIG. 7). The second melting temperature Tm2 and the second melting time tm2 are set such that the partition 420 is softened to close the air passages 600. The lower limit of the second melting temperature Tm2 is the second softening point (e.g., 434° C.). The second melting temperature Tm2 may be set at 460° C., for example. Also, the second melting time tm2 may be 30 minutes, for example.

In this embodiment, the gas exhausting step is started after the first melting step and ends when the second melting step ends as shown in FIG. 7. Thus, during the second melting step, the gas is exhausted from the first space 510 through the air passages 600, the second space 520, and the exhaust port 700. This creates a pressure difference between the inside and outside of the assembly 100. This pressure difference causes the first and second glass panes 200, 300 to approach each other. Thus, the second melting step includes forming the boundary wall 42 that closes the air passages 600 by deforming the partition 420 at the second melting temperature Tm2 while exhausting a gas from the first space 510 through the air passages 600, the second space 520, and the exhaust port 700.

In this embodiment, even before the temperature in the melting furnace reaches the second melting temperature Tm2, the first glass pane 200 is also heated, and therefore, the low-emissivity film 22 emits the rare gas into the first space 510. However, until the air passages 600 are closed, the gas continues to be exhausted from the first space 510, and therefore, the rare gas is also exhausted. On the other hand, once the air passages 600 have been closed, the first space 510 turns into the vacuum space 50 and the gases are no longer exhausted from the first space 510. Nevertheless, the low-emissivity film 22 is still heated in the melting furnace. Thus, making the low-emissivity film 22 have such properties as to satisfy the relationship between the emission quantity (c1) and emission quantity (c2) reduces the chances of emitting the rare gas into the first space 510, thus reducing the chances of causing a decrease in the degree of vacuum of the vacuum space 50. This reduces the transfer of heat in the vacuum space 50 via the rare gas, thus improving the thermal insulation properties of the glass panel unit 10.

Also, in the second melting step shown in FIG. 7, after the second melting time tm2 has passed, the temperature inside the melting furnace is lowered to room temperature at a constant rate. Then, the sealing head 820 is removed to finish the second melting step and the gas exhausting step. If the gap distance between the first and second glass panes 200, 300 is equal to or less than 50 μm, then the emission quantity (c3) of the rare gas emitted from the low-emissivity film 22 that remains heated in the melting furnace after the air passages 600 have been closed is suitably equal to or less than $5.0 \times 10^{-5}$ Pa·m$^3$/m$^2$. If the gap distance between the first and second glass panes 200, 300 is greater than 50 μm but equal to or less than 100 μm, then the emission quantity (c3) is suitably equal to or less than $1.0 \times 10^{-4}$ Pa·m$^3$/m$^2$. If the gap distance between the first and second glass panes 200, 300 is greater than 100 μm but equal to or less than 200 μm, then the emission quantity (c3) is suitably equal to or less than $2.0 \times 10^{-4}$ Pa·m$^3$/m$^2$. If the gap distance between the first and second glass panes 200, 300 is greater than 200 μm but equal to or less than 300 μm, then the emission quantity (c3) is suitably equal to or less than $3.0 \times 10^{-4}$ Pa·m$^3$/m$^2$. The emission quantity (c3) is not the quantity of the rare gas emitted per unit time from the low-emissivity film 22 but is proportional to the cumulative quantity of the rare gas that has been emitted from the low-emissivity film 22 in the interval after the air passages 600 have been closed and before the second melting step ends. Setting the emission quantity (c3) at any of the suitable values described above reduces, even if the low-emissivity film 22 emits the rare gas after the air passages 600 have been closed, the chances of causing a decrease in the degree of vacuum in the vacuum space 50. This may reduce the transfer of heat in the vacuum space 50 via the rare gas, thus improving the thermal insulation properties of the glass panel unit 10. Note that [Pa·m$^3$/m$^2$] as the unit of the emission quantity (c3) indicates the partial pressure of the rare gas emitted from the low-emissivity film 22 having an area of 1 m$^2$ into the vacuum space 50 having a volume of 1 m$^3$.

By performing these preparatory steps, the work in progress 110 shown in FIGS. 1 and 2 is obtained. As shown in FIGS. 1 and 2, the work in progress 110 includes the first glass pane 200, the second glass pane 300, the peripheral wall 410, and the boundary wall 42. In addition, the work in progress 110 also has the vacuum space 50 and the second space 520. The work in progress 110 further includes, in the vacuum space 50, the gas adsorbent 60 and the plurality of spacers (pillars) 70. The work in progress 110 further has the exhaust port 700.

The first and second glass panes 200, 300 each have a rectangular flat plate shape. The first and second glass panes 200, 300 have the same planar shape.

The first glass pane 200 includes the body 203 and the low-emissivity film 22. The low-emissivity film 22 is provided in the vacuum space 50 and covers the body 203. The low-emissivity film 22 is in contact with the body 203. The body 203 defines the main shape of the first glass pane 200, and therefore, has a rectangular flat plate shape.

The second glass pane 300 includes a body 303. The body 303 defines the main shape of the second glass pane 300, and therefore, has a rectangular flat plate shape. The body 303 has the same shape as the body 203. In this embodiment, the second glass pane 300 consists of the body 303 alone. Optionally, the second glass pane 300 may include not only the body 303 but also a low-emissivity film corresponding to the low-emissivity film 22. If the second glass pane 300 includes a low-emissivity film, then the low-emissivity film covers, and is in contact with, the body 303 in the vacuum space 50.

The boundary wall 42 (spatially) separates the vacuum space 50 from the second space 520. In other words, the second space 520 of the work in progress 110 (spatially) communicates with the external environment through the exhaust port 700, and therefore, the boundary wall 42 separates the vacuum space 50 from the external environment. The boundary wall 42 and the peripheral wall 410 together form a frame member 40 surrounding the vacuum space 50. The frame member 40 not only surrounds the vacuum space 50 entirely but also hermetically bonds the first and second glass panes 200, 300 together.

The gas adsorbent 60 is placed in the vacuum space 50. Specifically, the gas adsorbent 60 has an elongate flat-plate shape and is provided on the second glass pane 300. The gas adsorbent 60 is used to adsorb unnecessary gases (such as a residual gas). The unnecessary gases may be gases other than the gas emitted from the hot glues (namely, the first and second hot glues) forming the frame member 40 when the hot glues are heated and the rare gas is emitted from the low-emissivity film 22. Note that in this embodiment, the rare gas is also one of the unnecessary gases but is adsorbed into the gas adsorbent 60 less easily than the unnecessary gases other than the rare gas.

The plurality of spacers 70 are placed in the vacuum space 50. The plurality of spacers 70 is used to maintain a desired gap distance between the first and second glass panes 200, 300.

The vacuum space 50 is created by exhausting the gases from the first space 510 through the second space 520 and the exhaust port 700 as described above. In other words, the vacuum space 50 is the first space 510, of which the degree of vacuum is a predetermined value or less. The predetermined value may be 0.1 Pa, for example. The vacuum space 50 is perfectly closed hermetically by the first glass pane 200, the second glass pane 300, and the frame member 40, and therefore, is separated from the second space 520 and the exhaust port 700.

Figure 10:
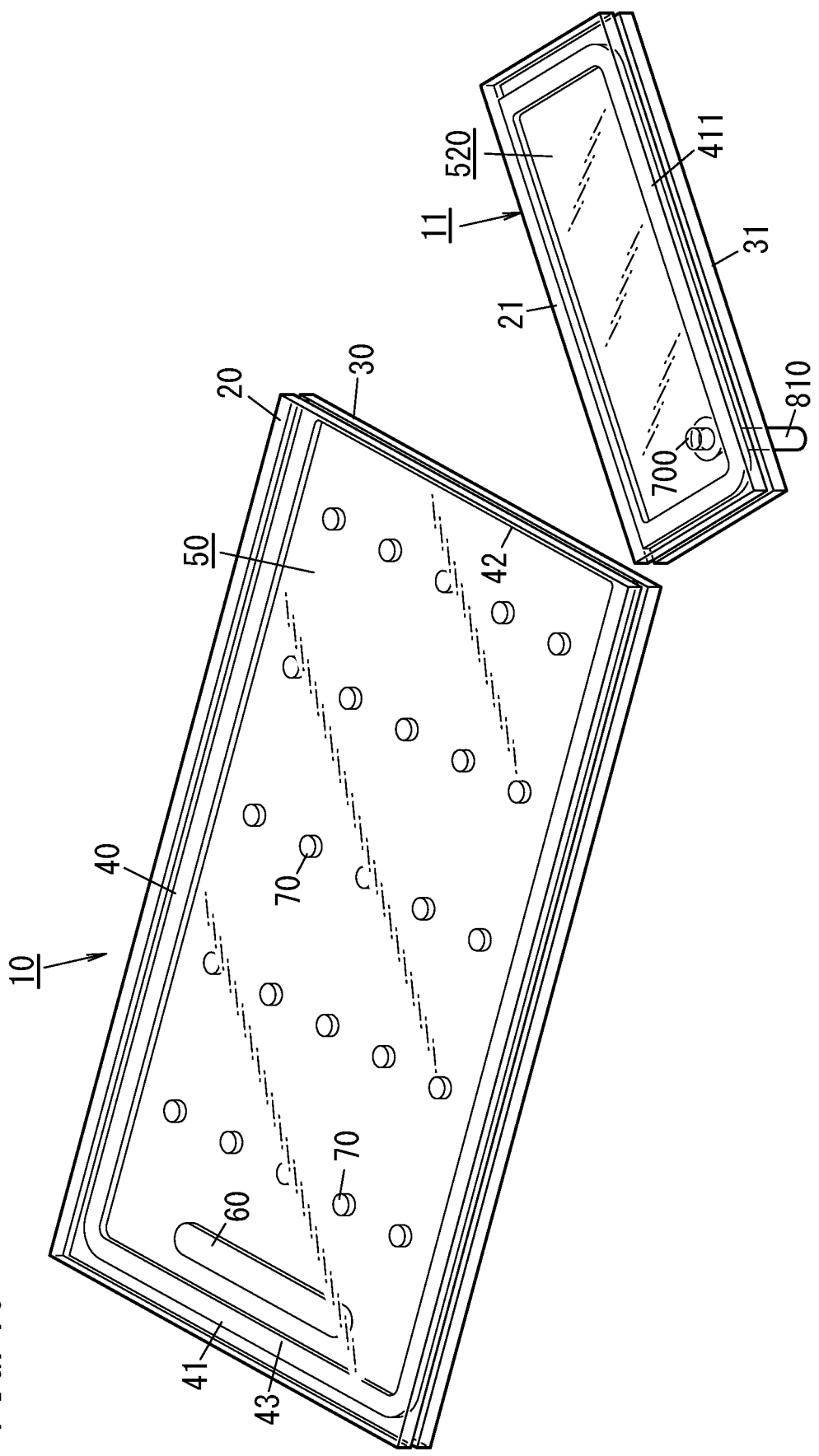
FIG. 10 illustrates yet another step of the method for manufacturing the glass panel unit according to the exemplary embodiment.

The removing step is performed after the preparatory steps have been performed. The removing step is the step of removing a portion 11 having the second space 520 from the work in progress 110 to obtain the glass panel unit 10 as a part having the vacuum space 50 as shown in FIG. 10.

The glass panel unit 10 includes the first glass pane 20 and the second glass pane 30. The first glass pane 20 is a part, corresponding to the first space 510 (vacuum space 50), of the first glass pane 200. The second glass pane 30 is a part, corresponding to the first space 510 (vacuum space 50), of the second glass pane 300.

On the other hand, the unnecessary portion 11 includes a part 21, corresponding to the second space 520, of the first glass pane 200 and a part 31, corresponding to the second space 520, of the second glass pane 300. The unnecessary portion 11 further includes a part 411, corresponding to the second space 520, of the peripheral wall 410. Note that the unnecessary portion 11 is suitably as small as possible, considering the manufacturing cost of the glass panel unit 10.

Specifically, in the removing step, the work in progress 110 unloaded from the melting furnace is cut off along the cutting line 900 shown in FIG. 1 to be divided into a part (glass panel unit) 10 having the vacuum space 50 and a part (unnecessary portion) 11 having the second space 520. Note that the shape of the cutting line 900 is determined by the shape of the glass panel unit 10. Since the glass panel unit 10 has a rectangular shape, the cutting line 900 has a linear shape aligned with the length of the boundary wall 42. In particular, in this embodiment, the cutting line 900 passes over the boundary wall 42. Specifically, the cutting line 900 passes through the middle of the width of the boundary wall 42 and extends along the length of the boundary wall 42. That is to say, in the removing step, the boundary wall 42 is split along the width thereof into two parts, one of which forms part of the frame member 40 of the glass panel unit 10 and the other of which is removed along with the unnecessary portion 11. Note that the cutting line 900 does not have to pass over the boundary wall 42. For example, if the cutting line 900 passes between the boundary wall 42 and the exhaust port 700, then a glass panel unit 10 with no exhaust ports 700 is obtained. Nevertheless, drawing the cutting line 900 over the boundary wall 42 allows the first and second glass panes 200, 300 to be cut off along with the boundary wall 42, thus achieving the advantage of facilitating cutting off the work in progress 110.

Figure 11:
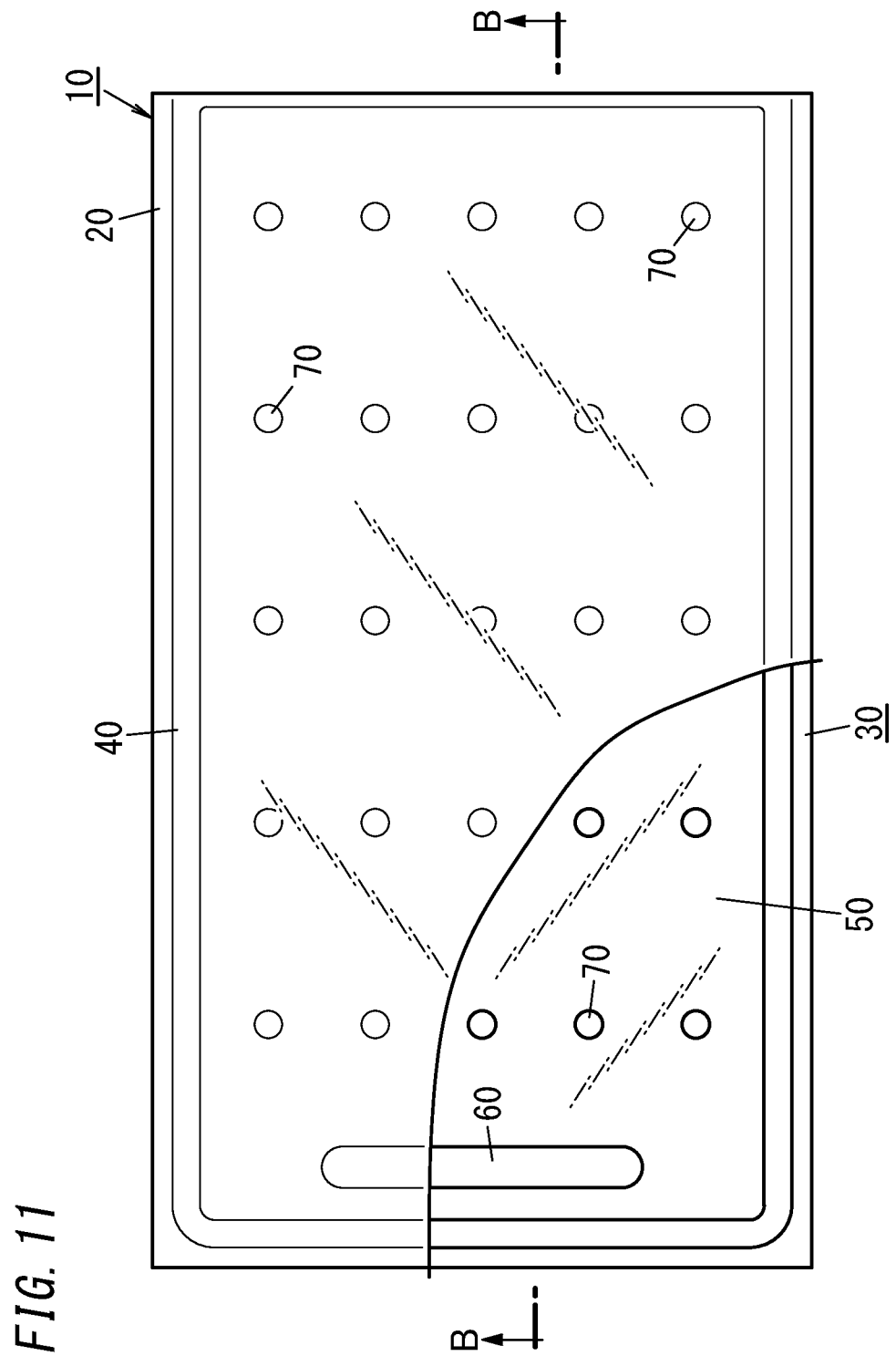
FIG. 11 is a schematic plan view of the glass panel unit according to the exemplary embodiment.
Figure 12:
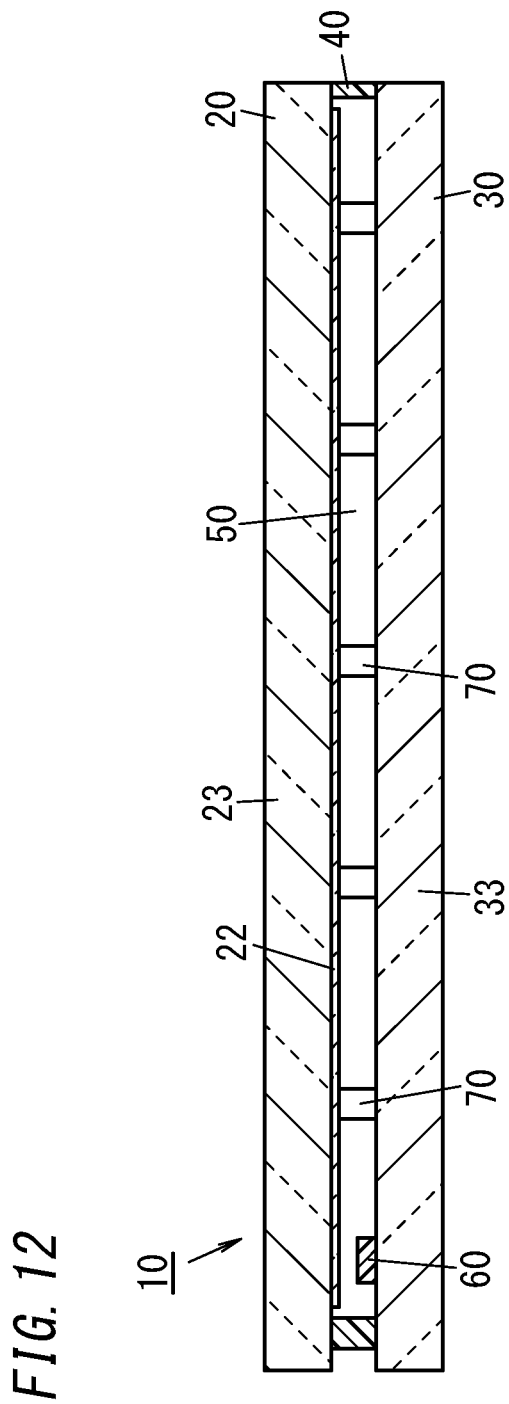
FIG. 12 is a cross-sectional view of the glass panel unit shown in FIG. 11 as taken along the plane B-B in FIG. 11.

The glass panel unit 10 shown in FIGS. 11 and 12 is obtained through the preparatory steps and removing step described above.

FIGS. 11 and 12 illustrate a glass panel unit (i.e., a glass panel unit as a final product) 10 according to this embodiment. The glass panel unit 10 includes the first glass pane 20, the second glass pane 30, and the frame member 40. In addition, the glass panel unit 10 further has the vacuum space 50 surrounded with the first and second glass panes 20, 30 and the frame member 40. The glass panel unit 10 further includes, within the vacuum space 50, the gas adsorbent 60 and the plurality of spacers (pillars) 70.

The first and second glass panes 20, 30 may each have a rectangular flat plate shape. The first and second glass panes 20, 30 have the same planar shape.

The first glass pane 20 includes the body 23 and the low-emissivity film 22. The low-emissivity film 22 is provided in the vacuum space 50 and covers the body 23. The body 23 defines the main shape of the first glass pane 20, and therefore, has a rectangular flat plate shape. In addition, the first glass pane 20 is obtained by removing the unnecessary part 21 from the first glass pane 200 through the removing step. Thus, the material of the body 23 is the same as that of the body 203.

The second glass pane 30 includes a body 33. The body 33 defines the main shape of the second glass pane 30, and therefore, has a rectangular flat plate shape. The body 33 has the same shape as the body 23. The second glass pane 30 is obtained by removing the unnecessary part 31 from the second glass pane 300 through the removing step. Thus, the material of the body 33 is the same as that of the body 303. In this embodiment, the second glass pane 30 consists of the body 33 alone. Optionally, the second glass pane 30 may include not only the body 33 but also a low-emissivity film corresponding to the low-emissivity film 22. If the second glass pane 30 includes a low-emissivity film, then the low-emissivity film covers, and is in contact with, the body 33 in the vacuum space 50.

The frame member 40 is provided between the first glass pane 20 and the second glass pane 30 to hermetically bond the first glass pane 20 and the second glass pane 30 together. Thus, the vacuum space 50 is surrounded with the first glass pane 20, the second glass pane 30, and the frame member 40. The frame member 40 has a polygonal (e.g., quadrangular in this embodiment) frame shape corresponding to that of the first and second glass panes 20, 30. The frame member 40 is formed along the respective outer peripheries of the first and second glass panes 20, 30.

The plurality of spacers 70 are placed in the vacuum space 50. The plurality of spacers 70 is used to maintain a desired gap distance between the first and second glass panes 20, 30.

EXAMPLES

Next, the exemplary embodiment will be described more specifically by way of illustrative examples.

First to Third Examples and First Comparative Example

Figure 13:
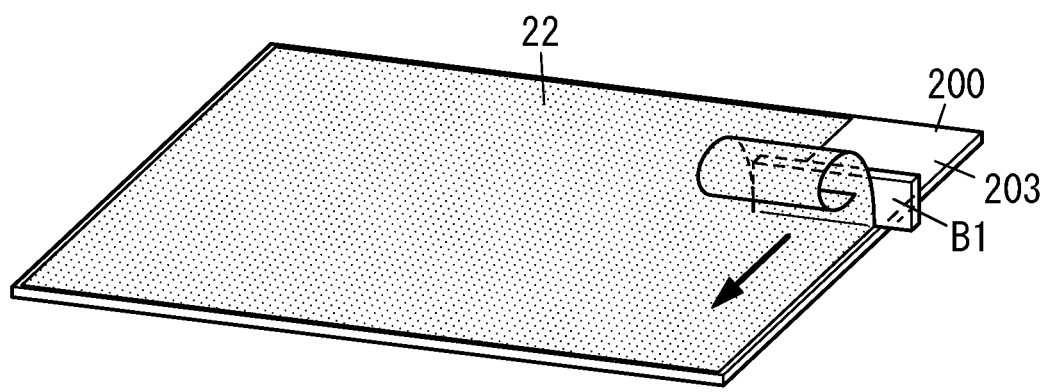
FIG. 13 is a schematic perspective view illustrating how to take a sample of a low-emissivity film from a glass pane.

First, as samples of the first glass pane 200 shown in FIG. 13, Glass Panes A, B, C, D, of which the respective low-emissivity films (Low-E films) 22 were different from each other, were prepared. First to third examples and a first comparative example were implemented using Glass Panes A, B, C, D, respectively. Each of the respective Low-E films 22 of Glass Panes A, B, C, D was a thin film containing silver and had been formed by sputtering.

First Example

Figure 14:
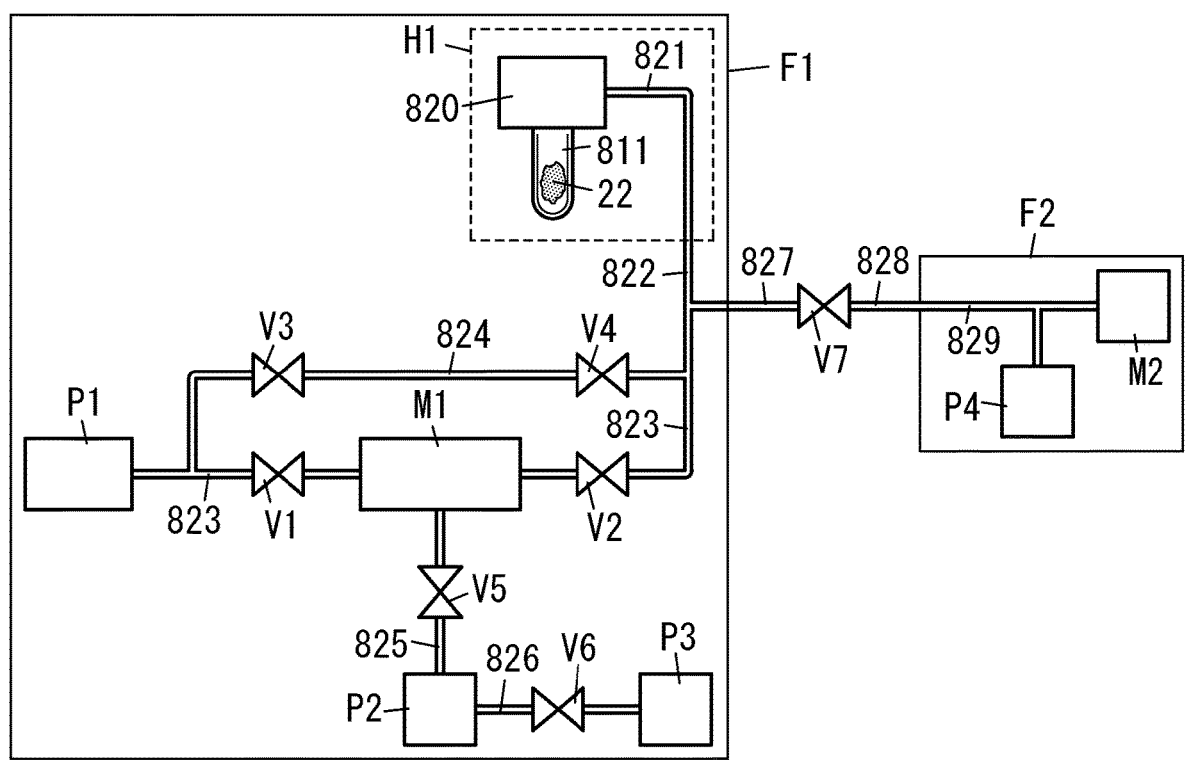
FIG. 14 is a schematic representation of a facility for evaluating the low-emissivity film.

A specimen of the Low-E film 22, of which the dimensions were 200 mm (width)×300 mm (length), was taken from Glass Pane A by using a metallic blade B1 as shown in FIG. 13. Then, this specimen of the Low-E film 22 was evaluated by the facility shown in FIG. 14. The facility shown in FIG. 14 is a glass panel unit manufacturing facility F1, to which a measuring apparatus F2 is attached.

The manufacturing facility F1 includes a melting furnace H1, a sealing head 820, exhaust paths 821-826, valves V1-V6, pumps P1-P3, and a manifold M1. The exhaust path 821 is provided in the melting furnace H1 to connect the sealing head 820 to a pipe of the melting furnace H1. The exhaust path 822 is provided outside of the melting furnace H1 and connects the exhaust path 823 to the pipe of the melting furnace H1. The exhaust path 823 connects the pump P1 to the exhaust path 822. In addition, the valve V1, the manifold M1, and the valve V2 are provided on the way for the exhaust path 823. The exhaust path 824 connects together the exhaust path 823 between the pump P1 and the valve V1 and the exhaust path 823 between the valve V2 and the exhaust path 822. Furthermore, the valves V3, V4 are provided on the way for the exhaust path 824. The exhaust path 825 connects the pump P2 to the manifold M1. The valve V5 is provided on the way for the exhaust path 825. The exhaust path 826 connects the pump P3 to the pump P2. The valve V6 is provided on the way for the exhaust path 826. The exhaust path 821 is configured as a pipe with flexibility and has an outside diameter of 8.5 mm and a length of 500 mm. The exhaust path 822 is configured as a pipe with flexibility and has an outside diameter of 16.5 mm and a length of 800 mm. The pump P1 is a dry pump (DS251L manufactured by Mitsubishi Heavy Industries, Ltd.). The pump P2 is a turbomolecular pump (TG220F manufactured by Osaka Vacuum, Ltd.). The pump P3 is a rotary pump (GLD-136A manufactured by Cosmotec Co., Ltd.). Note that out of the exhaust paths 823-826, the exhaust paths other than the valves V1-V6 or the manifold M1 is each configured as a pipe.

A valve V7 is provided between the manufacturing facility F1 and the measuring apparatus F2. An exhaust path 827 connects the valve V7 to the exhaust path 822. The exhaust path 827 is configured as a pipe with an outside diameter of 40 mm and a length of 200 mm.

The measuring apparatus F2 includes a measuring unit M2, a pump P4, and exhaust paths 828, 829. The exhaust path 828 connects the valve V7 to the exhaust path 829. The exhaust path 829 connects the exhaust path 829 to the measuring unit M2. The pump P4 is connected to a point on the exhaust path 829 between the measuring unit M2 and the exhaust path 828. The exhaust path 828 is configured as a pipe with flexibility and has an outside diameter of 50 mm and a length of 600 mm. The exhaust path 829 is configured as a pipe having an outside diameter of 40 mm and a length of 150 mm. The pump P4 is a turbomolecular pump (TMU071P manufactured by Pfeiffer Vacuum). The measuring unit M2 is a quadrupole mass (Q-mass) spectrometer (BGM-202 manufactured by ULVAC).

Figure 15:
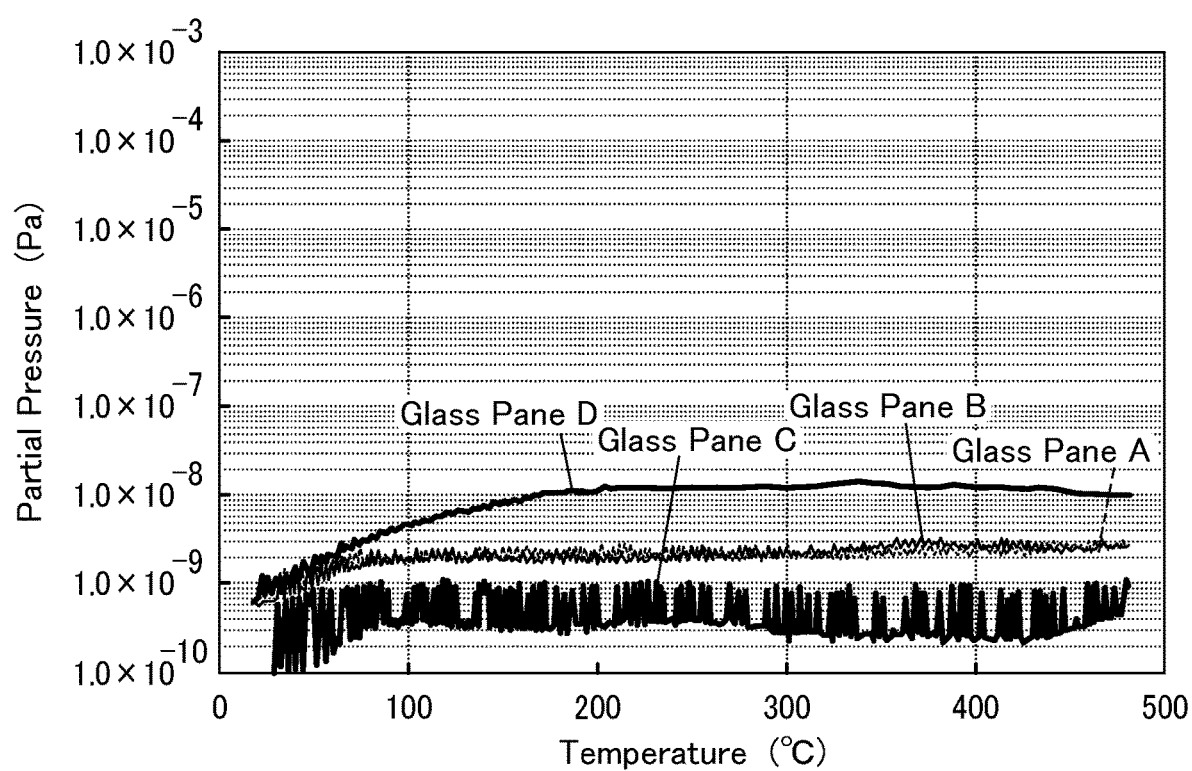
FIG. 15 is a graph showing, as an exemplary result of evaluation of the low-emissivity film, a relationship between a partial pressure of argon emitted from the low-emissivity film through heating and the heating temperature.

The specimen of the Low-E film 22, taken from Glass Pane A, was introduced airtight into a soda glass tube 811 with one end closed (having an outside diameter of 5 mm, an inside diameter of 3 mm, and a length of 70 mm) (see FIG. 14). After the specimen had been introduced thereto, the soda glass tube 811 was attached to the sealing head 820, which was then loaded into the melting furnace H1. After the sealing head 820 had been loaded, the pump P1 was activated with the valves V3-V7 closed, thereby exhausting a gas from the soda glass tube 811. After the pump P1 had been activated, the pump P2 was also activated with the valve V5 opened and the valve V1 closed, thereby further exhausting a gas from the soda glass tube 811. The present inventors confirmed that the atmospheric pressure indicated by a barometer of the manifold M1 reached $1.0 \times 10^{-5}$ Pa after the pump P2 had been activated. After that, the pump P4 was activated and the valve V7 was opened. After the pump P4 had been activated, the respective partial pressures of nitrogen and oxygen in the exhaust path 829 were measured with the measuring unit M2. A decision was made, by calculating the ratio of the partial pressures of nitrogen and oxygen, that the air had not flowed into any of the exhaust paths 821, 822, 827, 828, 829 connecting the soda glass tube 811 to the measuring unit M2. After this decision, the present inventors confirmed that the atmospheric pressure in the exhaust path 829 reached $1.0 \times 10^{-5}$ Pa. Then, the partial pressure of argon in the exhaust path 829 was measured continuously using the measuring unit M2 with the temperature in the melting furnace H1 increased at a constant temperature increase rate of 4° C./min from room temperature to 490° C. The results of measurement obtained by the measuring unit M2 are shown in FIG. 15. Among these results of measurement, the partial pressure of argon in a situation where the temperature in the melting furnace H1 was 100° C. and the partial pressure of argon in a situation where the temperature in the melting furnace H1 was 460° C. are shown in Table 1 to be referred to later.

Second Example

The Low-E film 22 was heated in the melting furnace H1 and the partial pressure of argon in the exhaust path 829 was measured by the measuring unit M2 in the same way as in the first example, except that Glass Pane B was used as the first glass pane 200 shown in FIG. 13. The results of the measurement are shown in FIG. 15 and Table 1 to be referred to later.

Third Example

The Low-E film 22 was heated in the melting furnace H1 and the partial pressure of argon in the exhaust path 829 was measured by the measuring unit M2 in the same way as in the first example, except that Glass Pane C was used as the first glass pane 200 shown in FIG. 13. The results of the measurement are shown in FIG. 15 and Table 1 to be referred to later.

First Comparative Example

The Low-E film 22 was heated in the melting furnace H1 and the partial pressure of argon in the exhaust path 829 was measured by the measuring unit M2 in the same way as in the first example, except that Glass Pane D was used as the first glass pane 200 shown in FIG. 13. The results of the measurement are shown in FIG. 15 and the following Table 1.

TABLE 1

| Temperature | Ex.1 Glass Pane A Ar partial pressure [Pa] | Ex.2 Glass Pane B Ar partial pressure [Pa] | Ex.3 Glass Pane C Ar partial pressure [Pa] | Cmp.Ex.1 Glass Pane D Ar partial pressure [Pa] |
| --- | --- | --- | --- | --- |
| 100° C. | $1.82 \times 10^{-9}$ | $1.92 \times 10^{-9}$ | $3.85 \times 10^{-10}$ | $4.72 \times 10^{-9}$ |
| 460° C. | $3.00 \times 10^{-9}$ | $2.37 \times 10^{-9}$ | $3.62 \times 10^{-10}$ | $1.06 \times 10^{-8}$ |
| Ratio of Ar partial pressure at 460° C. to Ar partial pressure at 100° C. | 1.65 | 1.23 | 0.94 | 2.25 |

In the first to third examples and the first comparative example shown in Table 1, the partial pressure of argon at 460° C. is supposed to be emission quantity (c1) according to this embodiment and the partial pressure of Argon at 100° C. is supposed to be emission quantity (c2) according to this embodiment.

The results shown in Table 1 reveal that the ratio of the emission quantity of argon emitted at 460° C. from the low-emissivity film 22 to the emission quantity of argon emitted at 100° C. from the low-emissivity film 22 was equal to or less than 2.0 in each of the first to third examples. On the other hand, the results shown in Table 1 also reveal that the ratio of the emission quantity of argon emitted at 460° C. from the low-emissivity film 22 to the emission quantity of argon emitted at 100° C. from the low-emissivity film 22 was greater than 2.0 in the first comparative example.

First to Fourth Manufacturing Examples

First to fourth manufacturing examples of glass panel units were respectively made using the following members:
Glass Pane A (representing the first example and having dimensions of 300 mm (width)×300 mm (length)×3 mm (thickness));
Glass Pane B (representing the second example and having dimensions of 300 mm (width)×300 mm (length)×3 mm (thickness));
Glass Pane C (representing the third example and having dimensions of 300 mm (width)×300 mm (length)×3 mm (thickness));
Glass Pane D (representing the first comparative example and having dimensions of 300 mm (width)×300 mm (length)×3 mm (thickness));
Second glass pane (having dimensions of 300 mm (width)×300 mm (length)×3 mm (thickness));
Spacers (having dimensions of 1 mm (diameter)×100 µm (height) and made of a resin);
First sealing material: bismuth-based glass frit (having a softening point of 434° C.); and
Second sealing material: bismuth-based glass frit (having a softening point of 434° C.).

First Manufacturing Example

First, a copper ion exchanged zeolite as a getter material and water were mixed to obtain a mixture. Next, on one surface of a second glass pane having an exhaust port, a peripheral wall made of a first sealing material, a partition made of a second sealing material, air passages, a gas adsorbent made of the mixture, and a plurality of spacers were provided. Next, Glass Pane A was used as the first glass pane and was arranged such that the Low-E film faced the second glass pane. In this manner, an assembly in which an internal space was created between Glass Pane A and the second glass pane was obtained. In addition, the plurality of spacers were placed with a chip mounter on the second glass pane such that an interval of 20 mm was left between each pair of adjacent spacers when the spacers were placed.

Subsequently, a sealing head was attached to an exhaust pipe that was bonded to the second glass pane such that the exhaust port was allowed to communicate with the inside of the exhaust pipe, thereby connecting a vacuum pump to the internal space. Then, the assembly was loaded into a melting furnace. After having loaded, the assembly was heated at 440° C. (first melting temperature) for 10 minutes to melt the peripheral wall once. When the peripheral wall was melted, the air passages were not closed yet.

After the peripheral wall had been melted, the temperature in the melting furnace was lowered to 390° C. representing an exhaust temperature. Then, the vacuum pump was activated to exhaust a gas from the internal space at 390° C. for 120 minutes.

Thereafter, with the vacuum pump still running, the temperature in the melting furnace was increased to 460° C. representing the second melting temperature and the assembly was heated at that temperature for 30 minutes. During this heating process, the partition was deformed to close the air passages and thereby form a boundary wall.

After the boundary wall had been formed, the temperature in the melting furnace was lowered to room temperature. After the temperature had been lowered, the vacuum pump was stopped and the sealing head was removed. After the sealing head had been removed, the unnecessary portion was removed by cutting, thus obtaining a glass panel unit.

Second Manufacturing Example

A glass panel unit was manufactured in the same way as in the first manufacturing example except that Glass Pane B was used as the first glass pane.

Third Manufacturing Example

A glass panel unit was manufactured in the same way as in the first manufacturing example except that Glass Pane C was used as the first glass pane.

Fourth Manufacturing Example

A glass panel unit was manufactured in the same way as in the first manufacturing example except that Glass Pane D was used as the first glass pane.
(Evaluation)
[Thermal Conductance]

The thermal conductance of each of the glass panel units of these manufacturing examples was evaluated in the following procedure. Specifically, a first thermometer was placed on the outer surface of the first glass pane and a second thermometer and a sensor were placed on the outer surface of the second glass pane such that a high-temperature portion and a low-temperature portion of the measuring apparatus were separated from each other by the glass panel unit. After that, the flux of heat transferred from a heated portion to a cooled portion via the glass panel unit was detected by the sensor, and the surface temperature of the first glass pane was measured with the first thermometer and the surface temperature of the second glass pane was measured with the second thermometer.

Then, the thermal conductance of the glass panel unit was calculated by substituting the heat flux, the surface temperature of the first glass pane, and the surface temperature of the second glass pane into the following Formula (1):

$$Q=C(T1-T2) \quad (1)$$

where Q indicates the heat flux ($W/m^2$), T1 indicates the surface temperature (K) of the first glass pane, T2 indicates the surface temperature (K) of the second glass pane, and C indicates the thermal conductance ($W/m^2K$).

In the first manufacturing example, the thermal conductance fell within the range from 0.8 $W/m^2K$ to 0.9 $W/m^2K$. In the second manufacturing example, the thermal conductance was 1.13 $W/m^2K$. In the third manufacturing example, the thermal conductance was 0.7 $W/m^2K$. In the fourth manufacturing example, the thermal conductance was 1.74 $W/m^2K$.

Meanwhile, each of Glass Panes A, B, C, and D was heated at 460° C. and then had its emissivity measured. As a result, Glass Pane A had an emissivity falling within the range from 0.055 to 0.065. Glass Pane B had an emissivity of 0.116. Glass Pane C had an emissivity falling within the range from 0.03 to 0.04. Glass Pane D had an emissivity of 0.062. Then, a predicted value of the thermal conductance of each manufacturing example was calculated based on these emissivity values in compliance with ISO/DIS 19916-1: 2017 Annex C. As a result, the predicted value in the first manufacturing example fell within the range from 0.80 W/m²K to 0.85 W/m²K. The predicted value in the second manufacturing example was 1.10 W/m²K. The predicted value in the third manufacturing example fell within the range from 0.68 W/m²K to 0.73 W/m²K. The predicted value in the fourth manufacturing example was 0.85 W/m²K.

As can be seen from these results, there was no significant difference between the actual and predicted values of the thermal conductance in any of the first to third manufacturing examples, while there was a difference of about 1 W/m²K between the actual and predicted values of the thermal conductance in the fourth manufacturing example. These results indicate that there was a significant difference between the actual and predicted values of the thermal conductance in the fourth manufacturing example probably because the Low-E film would have emitted argon gas continuously by being heated in the melting furnace even after the air passages had been closed. In addition, the argon gas emitted from the Low-E film would not have been adsorbed into the gas adsorbent but would have been still present in the vacuum space. In the first to third manufacturing examples, on the other hand, there was no significant difference between the actual and predicted values of the thermal conductance, and therefore, the Low-E film would not have emitted a significant quantity of argon gas even when heated in the melting furnace after the air passages had been closed. Thus, in the first to third manufacturing examples, the quantity of the argon gas in the vacuum space would have been reduced compared to the fourth manufacturing example. Consequently, as indicated by their actual values of the thermal conductance, the glass panel unit in each of the first to third manufacturing examples has thermal insulation properties superior to those of the fourth manufacturing example.

(Variations)

Note that the embodiment described above is only an example of the present disclosure and should not be construed as limiting. Rather, the embodiment may be readily modified in various manners depending on a design choice or any other factor without departing from a scope of the present disclosure. Next, variations of the embodiment described above will be enumerated one after another.

In the embodiment described above, only the first glass pane 200, out of the first and second glass panes 200, 300, includes the low-emissivity film 22. In one variation, the second glass pane 300 may also include a low-emissivity film. That is to say, each of the first and second glass panes 200, 300 may include the low-emissivity film. Thus, each of the first and second glass panes 20, 30 may also include the low-emissivity film.

In the embodiment described above, out of the first and second glass panes 200, 300, the first glass pane 200 includes the low-emissivity film 22 but the second glass pane 300 includes no low-emissivity films. In a variation, however, the second glass pane 300 may include a low-emissivity film and the first glass pane 200 may include no low-emissivity film 22. Thus, in a glass panel unit 10 according to a variation, the second glass pane 30 may include a low-emissivity film and the first glass pane 20 may include no low-emissivity film 22.

In the embodiment described above, a rare gas is cited as an exemplary gas emitted from the low-emissivity film 22. In a variation, the low-emissivity film 22 may emit not only the rare gas but also other gases such as hydrogen, nitrogen, hydrocarbon, and silicon dioxide gases as well when heated. Each of these gases is adsorbed into the gas adsorbent 60, and therefore, hardly causes a decline in the thermal insulation properties of the glass panel unit 10.

In the embodiment described above, the gas exhausting step is started after the first melting step has ended. In a variation, if the temperature in the melting furnace is lower than the first softening point after the first melting time tm1 has passed, then the gas exhausting step may be started halfway through the first melting step.

In the embodiment described above, the gas exhausting step ends when the second melting step ends. In a variation, the gas exhausting step may be started after the first melting step has ended and may end before the second melting step ends.

In the embodiment described above, the glass panel unit 10 has a rectangular shape. Alternatively, in a variation, the glass panel unit 10 may also have a circular, polygonal, or any other desired shape. That is to say, the first glass pane 20, the second glass pane 30, and the frame member 40 do not have to be rectangular but may also have a circular, polygonal, or any other desired shape. In addition, the respective shapes of the first glass pane 200, the second glass pane 300, the peripheral wall 410, and the partition 420 do not have to be the ones adopted in the embodiment described above but may also be any other shapes that allow a glass panel unit 10 of a desired shape to be obtained. Note that the shape and dimensions of the glass panel unit 10 may be determined according to the intended use of the glass panel unit 10.

The first and second glass panes 20, 30 do not have to have the same planar shape and planar dimensions. Also, the body 23 of the first glass pane 20 does not have to have the same thickness as the body 33 of the second glass pane 30, either. In addition, the bodies 23 and 33 do not have to be made of the same material, either. The same statement applies to the first and second glass panes 200, 300 as well.

The peripheral wall 410 does not have to have the same planar shape as the first and second glass panes 200, 300, either.

Optionally, the peripheral wall 410 may include not only the first sealing material but also any other element such as a core material. The partition 420 (boundary wall 42) may include not only the second sealing material but also any other element such as a core material.

Also, in the assembly 100, the peripheral wall 410 is just provided between the first and second glass panes 200, 300 and does not bond the first and second glass panes 200, 300 together. Optionally, however, in the assembly 100 stage, the peripheral wall 410 may bond the first and second glass panes 200, 300 together. In short, in the assembly 100, the peripheral wall 410 needs to be provided between the first and second glass panes 200, 300 and does not have to bond the first and second glass panes 200, 300 together.

Furthermore, in the embodiment described above, the partition 420 is out of contact with the peripheral wall 410. This allows air passages 610, 620 to be formed in the respective gaps between both ends of the partition 420 and the peripheral wall 410. However, this is only an example and should not be construed as limiting. Alternatively, only one of the two ends of the partition 420 may be coupled to the peripheral wall 410. In that case, a single air passage 600 may be formed between the partition 420 and the peripheral wall 410. Still alternatively, the partition 420 may even have both ends thereof coupled to the peripheral wall 410. In that case, the air passage 600 may be a through hole provided through the partition 420. Alternatively, the air passage 600 may also be a gap between the partition 420 and the first glass pane 200. Still alternatively, the partition 420 may be made up of two or more partitions arranged at intervals. In that case, the air passage 600 may be a gap left between the two or more partitions.

Furthermore, in the embodiment described above, the internal space 500 is partitioned into the single first space 510 and the single second space 520. However, this is only an example and should not be construed as limiting. Alternatively, the internal space 500 may also be partitioned by the partition 420 into one or more first spaces 510 and one or more second spaces 520. If the internal space 500 has two or more first spaces 510, two or more glass panel units 10 may be obtained from a single work in progress 110.

In the embodiment described above, the air passages 600 include the two air passages 610, 620. Alternatively, only one air passage 600 may be provided or the air passages 600 may include three or more air passages. Furthermore, the air passages 600 may have any shape without limitation.

In the embodiment described above, the exhaust port 700 is provided through the second glass pane 300. However, this is only an example and should not be construed as limiting. Alternatively, the exhaust port 700 may be provided through the first glass pane 200 or may also be provided through the part 411, corresponding to the second space 520, of the peripheral wall 410. In short, the exhaust port 700 just needs to be provided for the unnecessary portion 11.

In the embodiment described above, the getter material in the gas adsorbent 60 is an evaporative getter. Alternatively, the getter material may also be a non-evaporative getter.

In the embodiment described above, the first space 510 is the vacuum space 50. However, the vacuum space 50 may be replaced with an evacuated space. The evacuated space is the first space 510 in a pressure-reduced condition. As used herein, the "pressure reduced condition" refers to a condition in which the pressure is lower than the atmospheric pressure.

(Recapitulation)

As can be seen from the foregoing description, the embodiment and its variations described above may be specific implementations of the following aspects of the present disclosure.

A first aspect is a method for manufacturing a glass panel unit (10). The method includes an assembling step, a bonding step, a gas exhausting step, and a sealing step. The assembling step includes providing an assembly (100). The assembly (100) includes a first glass pane (200), a second glass pane (300), a peripheral wall (410), an internal space (500), a partition (420), an exhaust port (700), and an air passage (600). The second glass pane (300) is arranged to face the first glass pane (200). The peripheral wall (410) has a frame shape and is provided between the first glass pane (200) and the second glass pane (300). The internal space (500) is surrounded with the first glass pane (200), the second glass pane (300), and the peripheral wall (410). The partition (420) partitions the internal space (500) into a first space (510) and a second space (520). The exhaust port (700) allows the second space (520) to communicate with an external environment. The air passage (600) allows the first space (510) to communicate with the second space (520). At least one of the first glass pane (200) or the second glass pane (300) includes a low-emissivity film (22). The low-emissivity film (22) is provided in the first space (510). The bonding step includes melting the peripheral wall (410) to hermetically bond the first glass pane (200) and the second glass pane (300) together with the peripheral wall (410). The gas exhausting step includes exhausting a gas from the first space (510) through the air passage (600), the second space (520), and the exhaust port (700). The sealing step includes deforming the partition (420) at a temperature equal to or higher than a softening point of the partition (420) to close the air passage (600). In a situation where the low-emissivity film (22) is heated at a temperature increase rate of 4° C./min before the peripheral wall (410) is melted, a ratio of an emission quantity of a rare gas emitted from the low-emissivity film (22) at a deformation temperature of the partition (420) to an emission quantity of the rare gas emitted from the low-emissivity film (22) at 100° C. is equal to or less than 2.0.

The first aspect may reduce the emission quantity of a rare gas emitted from the low-emissivity film (22) after the partition (420) has been deformed to close the air passage (600). This allows reducing the quantity of the rare gas remaining in the first space (510) after the gas exhausting step and thereby reducing the transfer of heat in the first space (510) via the rare gas, thus improving the thermal insulation properties of the glass panel unit (10).

A second aspect is a specific implementation of the method for manufacturing a glass panel unit (10) according to the first aspect. In the second aspect, the ratio of the emission quantity of the rare gas emitted from the low-emissivity film (22) at the deformation temperature of the partition (420) to the emission quantity of the rare gas emitted from the low-emissivity film (22) at 100° C. is equal to or less than 1.5.

The second aspect may reduce the emission quantity of a rare gas emitted from the low-emissivity film (22) after the partition (420) has been deformed to close the air passage (600). This allows reducing the quantity of the rare gas remaining in the first space (510) after the gas exhausting step and thereby reducing the transfer of heat in the first space (510) via the rare gas, thus improving the thermal insulation properties of the glass panel unit (10).

A third aspect is a specific implementation of the method for manufacturing a glass panel unit (10) according to the second aspect. In the third aspect, the ratio of the emission quantity of the rare gas emitted from the low-emissivity film (22) at the deformation temperature of the partition (420) to the emission quantity of the rare gas emitted from the low-emissivity film (22) at 100° C. is equal to or less than 1.0.

The third aspect may reduce the emission quantity of a rare gas emitted from the low-emissivity film (22) after the partition (420) has been deformed to close the air passage (600). This allows reducing the quantity of the rare gas remaining in the first space (510) after the gas exhausting step and thereby reducing the transfer of heat in the first space (510) via the rare gas, thus improving the thermal insulation properties of the glass panel unit (10).

A fourth aspect is a specific implementation of the method for manufacturing a glass panel unit (10) according to the third aspect. In the fourth aspect, the emission quantity of the rare gas emitted from the low-emissivity film (22) at the deformation temperature of the partition (420) is smaller than the emission quantity of the rare gas emitted from the low-emissivity film (22) at 100° C.

The fourth aspect may reduce the emission quantity of a rare gas emitted from the low-emissivity film (22) after the partition (420) has been deformed to close the air passage (600). This allows reducing the quantity of the rare gas remaining in the first space (510) after the gas exhausting step and thereby reducing the transfer of heat in the first space (510) via the rare gas, thus improving the thermal insulation properties of the glass panel unit (10).

A fifth aspect is a specific implementation of the method for manufacturing a glass panel unit (10) according to any one of the first to fourth aspects. In the fifth aspect, the rare gas includes argon.

The fifth aspect may reduce the emission quantity of a rare gas emitted from the low-emissivity film (22) after the partition (420) has been deformed to close the air passage (600). This allows reducing the quantity of the rare gas remaining in the first space (510) after the gas exhausting step and thereby reducing the transfer of heat in the first space (510) via the rare gas, thus improving the thermal insulation properties of the glass panel unit (10).

A sixth fifth aspect is a specific implementation of the method for manufacturing a glass panel unit (10) according to any one of the first to fifth aspects. In the sixth aspect, the softening point of the partition (420) is equal to a softening point of the peripheral wall (410).

The sixth aspect may reduce the emission quantity of a rare gas emitted from the low-emissivity film (22) after the partition (420) has been deformed to close the air passage (600). This allows reducing the quantity of the rare gas remaining in the first space (510) after the gas exhausting step and thereby reducing the transfer of heat in the first space (510) via the rare gas, thus improving the thermal insulation properties of the glass panel unit (10).

A seventh aspect is a specific implementation of the method for manufacturing a glass panel unit (10) according to any one of the first to sixth aspects. In the seventh aspect, the method further includes a removing step. The removing step includes removing a portion (11) including the second space (520) to obtain a glass panel unit (10) as a part including the first space (510).

The seventh aspect may reduce the emission quantity of a rare gas emitted from the low-emissivity film (22) after the partition (420) has been deformed to close the air passage (600). This allows reducing the quantity of the rare gas remaining in the first space (510) after the gas exhausting step and thereby reducing the transfer of heat in the first space (510) via the rare gas, thus improving the thermal insulation properties of the glass panel unit (10).

An eighth aspect is an assembly (100) for use to make a glass panel unit (10). The assembly (100) includes a first glass pane (200), a second glass pane (300), a peripheral wall (410), an internal space (500), a partition (420), an exhaust port (700), and an air passage (600). The second glass pane (300) is arranged to face the first glass pane (200). The peripheral wall (410) has a frame shape and is provided between the first glass pane (200) and the second glass pane (300). The internal space (500) is surrounded with the first glass pane (200), the second glass pane (300), and the peripheral wall (410). The partition (420) partitions the internal space (500) into a first space (510) and a second space (520). The exhaust port (700) allows the second space (520) to communicate with an external environment. The air passage (600) allows the first space (510) to communicate with the second space (520). At least one of the first glass pane (200) or the second glass pane (300) includes a low-emissivity film (22). The low-emissivity film (22) is provided in the first space (510). In a situation where the low-emissivity film (22) is heated at a temperature increase rate of 4° C./min before the peripheral wall (410) is melted, a ratio of an emission quantity of a rare gas emitted from the low-emissivity film (22) at a deformation temperature of the partition (420) to an emission quantity of the rare gas emitted from the low-emissivity film (22) at 100° C. is equal to or less than 2.0.

The eighth aspect may reduce the emission quantity of a rare gas emitted from the low-emissivity film (22) after the partition (420) has been deformed to close the air passage (600).

This allows reducing the quantity of the rare gas remaining in the first space (510) after the gas exhausting step and thereby reducing the transfer of heat in the first space (510) via the rare gas, thus improving the thermal insulation properties of the glass panel unit (10).

REFERENCE SIGNS LIST

10 Glass Panel Unit
100 Assembly
200 First Glass Pane
300 Second Glass Pane
22 Low-Emissivity Film
410 Peripheral Wall
420 Partition
500 Internal Space
510 First Space
520 Second Space
600 Air Passage
700 Exhaust Port

The invention claimed is:

1. A method for manufacturing a glass panel unit, the method comprising an assembling step, a bonding step, a gas exhausting step, and a sealing step,
   the assembling step including providing an assembly,
   the assembly including:
   a first glass pane;
   a second glass pane arranged to face the first glass pane;
   a peripheral wall having a frame shape and provided between the first glass pane and the second glass pane;
   an internal space surrounded with the first glass pane, the second glass pane, and the peripheral wall;
   a partition to partition the internal space into a first space and a second space;
   an exhaust port allowing the second space to communicate with an external environment; and
   an air passage allowing the first space to communicate with the second space,
   at least one of the first glass pane or the second glass pane including a low-emissivity film,
   the low-emissivity film being provided in the first space,
   the bonding step including melting the peripheral wall to hermetically bond the first glass pane and the second glass pane together with the peripheral wall,
   the gas exhausting step including exhausting a gas from the first space through the air passage, the second space, and the exhaust port,
   the sealing step including deforming the partition at a temperature equal to or higher than a softening point of the partition to close the air passage,
   a ratio of an emission quantity of a rare gas emitted, in a situation where the low-emissivity film is heated at a temperature increase rate of 4° C./min before the peripheral wall is melted, from the low-emissivity film at a deformation temperature of the partition to an emission quantity of the rare gas emitted from the low-emissivity film at 100° C. being equal to or less than 2.0.

2. The method of claim 1, wherein
   the ratio of the emission quantity of the rare gas emitted from the low-emissivity film at the deformation temperature of the partition to the emission quantity of the rare gas emitted from the low-emissivity film at 100° C. is equal to or less than 1.5.

3. The method of claim 2, wherein
the ratio of the emission quantity of the rare gas emitted from the low-emissivity film at the deformation temperature of the partition to the emission quantity of the rare gas emitted from the low-emissivity film at 100° C. is equal to or less than 1.0.

4. The method of claim 3, wherein
the emission quantity of the rare gas emitted from the low-emissivity film at the deformation temperature of the partition is smaller than the emission quantity of the rare gas emitted from the low-emissivity film at 100° C.

5. The method of claim 1, wherein
the rare gas includes argon.

6. The method of claim 1, wherein
the softening point of the partition is equal to a softening point of the peripheral wall.

7. The method of claim 1, further comprising a removing step,
the removing step including removing a portion including the second space to obtain a glass panel unit as a part including the first space.

8. An assembly for use to make a glass panel unit, the assembly comprising:
a first glass pane;
a second glass pane arranged to face the first glass pane;
a peripheral wall having a frame shape and provided between the first glass pane and the second glass pane;
an internal space surrounded with the first glass pane, the second glass pane, and the peripheral wall;
a partition to partition the internal space into a first space and a second space;
an exhaust port allowing the second space to communicate with an external environment; and
an air passage allowing the first space to communicate with the second space,
at least one of the first glass pane or the second glass pane including a low-emissivity film,
the low-emissivity film being provided in the first space,
a ratio of an emission quantity of a rare gas emitted, in a situation where the low-emissivity film is heated at a temperature increase rate of 4° C./min before the peripheral wall is melted, from the low-emissivity film at a deformation temperature of the partition to an emission quantity of the rare gas emitted from the low-emissivity film at 100° C. being equal to or less than 2.0.

* * * * *